(12) United States Patent
Kurlak et al.

(10) Patent No.: US 11,506,060 B1
(45) Date of Patent: Nov. 22, 2022

(54) RADIAL TURBINE ROTOR FOR GAS TURBINE ENGINE

(71) Applicant: HONEYWELL INTERNATIONAL INC., Charlotte, NC (US)

(72) Inventors: Paul Kurlak, Phoenix, AZ (US); Ardeshir Riahi, Phoenix, AZ (US); Benjamin D. Kamrath, Phoenix, AZ (US); Jason Smoke, Phoenix, AZ (US); John McClintic, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/305,828

(22) Filed: Jul. 15, 2021

(51) Int. Cl.
*F01D 11/00* (2006.01)
*F01D 5/20* (2006.01)
*F01D 5/06* (2006.01)
*F01D 5/14* (2006.01)

(52) U.S. Cl.
CPC .......... *F01D 5/147* (2013.01); *F05D 2220/32* (2013.01); *F05D 2240/30* (2013.01); *F05D 2240/55* (2013.01)

(58) Field of Classification Search
CPC .......... F01D 11/001; F01D 5/081; F01D 5/20; F01D 11/006; F01D 5/06; F01D 5/066; F05D 2240/11; F05D 2220/32; F05D 2240/55; F02C 3/04
See application file for complete search history.

(56) References Cited

U.S. PATENT DOCUMENTS

| 4,335,997 | A  |   | 6/1982  | Ewing et al. |             |
|-----------|----|---|---------|--------------|-------------|
| 4,884,950 | A  | * | 12/1989 | Brodell      | F01D 11/001 |
|           |    |   |         |              | 416/198 A   |
| 6,022,190 | A  |   | 2/2000  | Schillinger  |             |
| 6,315,298 | B1 | * | 11/2001 | Kildea       | F01D 11/008 |
|           |    |   |         |              | 277/433     |
| 6,499,953 | B1 |   | 12/2002 | Bellerose et al. |         |
| 7,481,625 | B2 |   | 1/2009  | Kim          |             |
| 9,714,577 | B2 |   | 7/2017  | Kington et al. |           |
| 10,807,166 | B2 |  | 10/2020 | Chase et al. |             |
| 2007/0224047 | A1 | | 9/2007  | Falk et al.  |             |
| 2009/0116953 | A1 | * | 5/2009 | Spangler     | F01D 11/008 |
|           |    |   |         |              | 415/115     |
| 2013/0098061 | A1 | | 4/2013  | Matwey et al. |           |
| 2013/0272882 | A1 | | 10/2013 | Mittendorf et al. |       |

(Continued)

FOREIGN PATENT DOCUMENTS

CN 102691527 A 9/2012

*Primary Examiner* — Long T Tran
(74) *Attorney, Agent, or Firm* — Lorenz & Kopf, LLP

(57) ABSTRACT

A radial turbine rotor associated with an engine includes a disk, and a plurality of blades spaced apart about a perimeter of the disk. Each blade includes a forward end, an aft end and a root. The radial turbine rotor includes a plurality of sectors, with each sector coupled to the root of a respective blade of the plurality of blades. Each sector of the plurality of sectors defines a first surface configured to contact a working fluid and a second surface configured to be coupled to the disk, and each sector of the plurality of sectors defines at least one pocket between the first surface and the second surface proximate the forward end that extends toward the aft end. The radial turbine rotor includes a feather seal slot defined between adjacent sectors of the plurality of sectors proximate the first surface.

20 Claims, 9 Drawing Sheets

(56) References Cited

U.S. PATENT DOCUMENTS

| | | | |
|---|---|---|---|
| 2014/0348664 A1 | 11/2014 | Jan et al. | |
| 2015/0024944 A1* | 1/2015 | Short | C40B 50/06 |
| | | | 506/1 |
| 2015/0118048 A1 | 4/2015 | Kington et al. | |
| 2015/0377052 A1* | 12/2015 | Hill | F01D 11/008 |
| | | | 416/174 |
| 2016/0024944 A1* | 1/2016 | Suciu | F02C 3/04 |
| | | | 60/805 |
| 2016/0047260 A1* | 2/2016 | McCaffrey | F01D 5/3007 |
| | | | 416/223 A |
| 2016/0061048 A1* | 3/2016 | Corcoran | F01D 15/12 |
| | | | 416/171 |
| 2016/0084090 A1* | 3/2016 | Suciu | F01D 5/06 |
| | | | 416/1 |
| 2017/0107821 A1 | 4/2017 | Schwarz | |
| 2020/0248711 A1* | 8/2020 | Shaughnessy | F04D 29/329 |
| 2020/0362715 A1* | 11/2020 | Propheter-Hinckley | |
| | | | F01D 11/006 |

* cited by examiner

RADIAL TURBINE ROTOR FOR GAS TURBINE ENGINE

TECHNICAL FIELD

The present disclosure generally relates to gas turbine engines, and more particularly relates to a radial turbine rotor for a gas turbine engine.

BACKGROUND

Gas turbine engines may be employed to provide power to various devices. For example, a gas turbine engine may be employed as an auxiliary power unit to provide power to a mobile platform, such as an aircraft, tank, etc. In certain examples, gas turbine engines include a radial turbine rotor positioned immediately downstream of a combustion section of the gas turbine engine. Generally, higher radial turbine rotor working fluid temperature and higher radial turbine rotor speed are required to improve gas turbine engine efficiency. Increased speeds and higher temperatures, however, may increase cyclic stress-induced fatigue of the radial turbine rotor.

Accordingly, it is desirable to provide a radial turbine rotor with reduced stresses for operating at increased rotational speeds. In addition, it is desirable to provide a radial turbine rotor that isolates the high temperature turbine working fluid from a remainder of the radial turbine rotor during the operation of the gas turbine engine to reduce thermal induced fatigue. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a radial turbine rotor associated with an engine. The radial turbine rotor includes a disk, and a plurality of blades spaced apart about a perimeter of the disk. Each blade of the plurality of blades includes a forward end, an aft end and a root. The radial turbine rotor includes a plurality of sectors, with each sector of the plurality of sectors coupled to the root of a respective blade of the plurality of blades. Each sector of the plurality of sectors defines a first surface configured to contact a working fluid and a second surface configured to be coupled to the disk, and each sector of the plurality of sectors defines at least one pocket between the first surface and the second surface proximate the forward end that extends toward the aft end. The radial turbine rotor includes a feather seal slot defined between adjacent sectors of the plurality of sectors proximate the first surface.

Each blade of the plurality of blades includes a pressure side opposite a suction side, and the at least one pocket includes a first pocket defined in each sector of the plurality of sectors proximate the pressure side and a second pocket defined in each sector of the plurality of sectors proximate the suction side. A recess of the feather seal slot is defined radially outboard of the at least one pocket. A recess of the feather seal slot is in communication with the at least one pocket. The at least one pocket is defined between the first surface and the second surface to extend from proximate the forward end to the aft end such that the at least one pocket is coextensive with a second end of the recess of the feather seal slot. The radial turbine rotor is an axially split radial turbine rotor with a first radial turbine rotor coupled to a second radial turbine rotor, and the first radial turbine rotor includes the disk, the plurality of blades and the plurality of sectors. The second radial turbine rotor includes a second disk, a plurality of second blades spaced apart about a perimeter of the second disk and a plurality of second sectors, with each second sector of the plurality of second sectors coupled to a respective second blade of the plurality of second blades, and a second feather seal slot is defined between adjacent second sectors of the plurality of second sectors. The radial turbine rotor includes a plurality of stress relief slots defined between the adjacent sectors of the plurality of sectors of the first radial turbine rotor. The second radial turbine rotor includes a second plurality of stress relief slots defined through the adjacent second sectors of the plurality of second sectors. The second radial turbine rotor includes a second plurality of second stress relief holes, each second stress relief hole of the second plurality of stress relief holes defined through at least a portion of the disk, and each of the second plurality of stress relief slots is in communication with a respective second stress relief hole of the second plurality of second stress relief holes. The first radial turbine rotor further comprises a plurality of stress relief holes, each stress relief hole of the plurality of stress relief holes defined through at least a portion of the disk, and each of the plurality of stress relief slots is in communication with a respective stress relief hole of the plurality of stress relief holes. Each stress relief hole of the plurality of stress relief holes is offset from each second stress relief hole of the second plurality of second stress relief holes. Each stress relief hole of the plurality of stress relief holes is coincident with each second stress relief hole of the second plurality of stress relief holes. Each sector of the plurality of sectors includes a first feather seal recess defined proximate the suction side and a second feather seal recess defined proximate the pressure side, with the first feather seal recess and the second feather seal recess cooperating to define the feather seal slot between the adjacent sectors of the plurality of sectors. The second feather seal slot is misaligned with the feather seal slot. The at least one pocket is a void defined in each sector of the plurality of sectors.

Further provided is a radial turbine rotor associated with an engine. The radial turbine rotor includes a disk, and a plurality of blades spaced apart about a perimeter of the disk. Each blade of the plurality of blades includes a forward end, an aft end and a root. The radial turbine rotor includes a plurality of sectors, with each sector of the plurality of sectors coupled to the root of a respective blade of the plurality of blades. Each sector of the plurality of sectors defines a first surface configured to contact a working fluid and a second surface configured to be coupled to the disk. Each sector of the plurality of sectors has a first side, a second side opposite the first side and defines a first pocket between the first surface and the second surface proximate the forward end that extends toward the aft end along the first side, and a second pocket between the first surface and the second surface proximate the leading end that extends toward the trailing end along the second side. The second side is opposite the first side. The radial turbine rotor includes a feather seal slot defined between adjacent ones of the plurality of sectors proximate the first surface.

A recess of the feather seal slot is defined radially outboard of the at least one pocket. A recess of the feather seal slot is in communication with the first pocket. The radial turbine rotor is an axially split radial turbine rotor with a first radial turbine rotor coupled to a second radial turbine rotor. The first radial turbine rotor includes the disk, the plurality of blades and the plurality of sectors, and the second radial turbine rotor includes a second disk, a plurality of second blades spaced apart about a perimeter of the second disk and a plurality of second sectors. Each second sector of the plurality of second sectors is coupled to a respective second blade of the plurality of second blades and a second feather seal slot is defined between adjacent second sectors of the plurality of second sectors.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
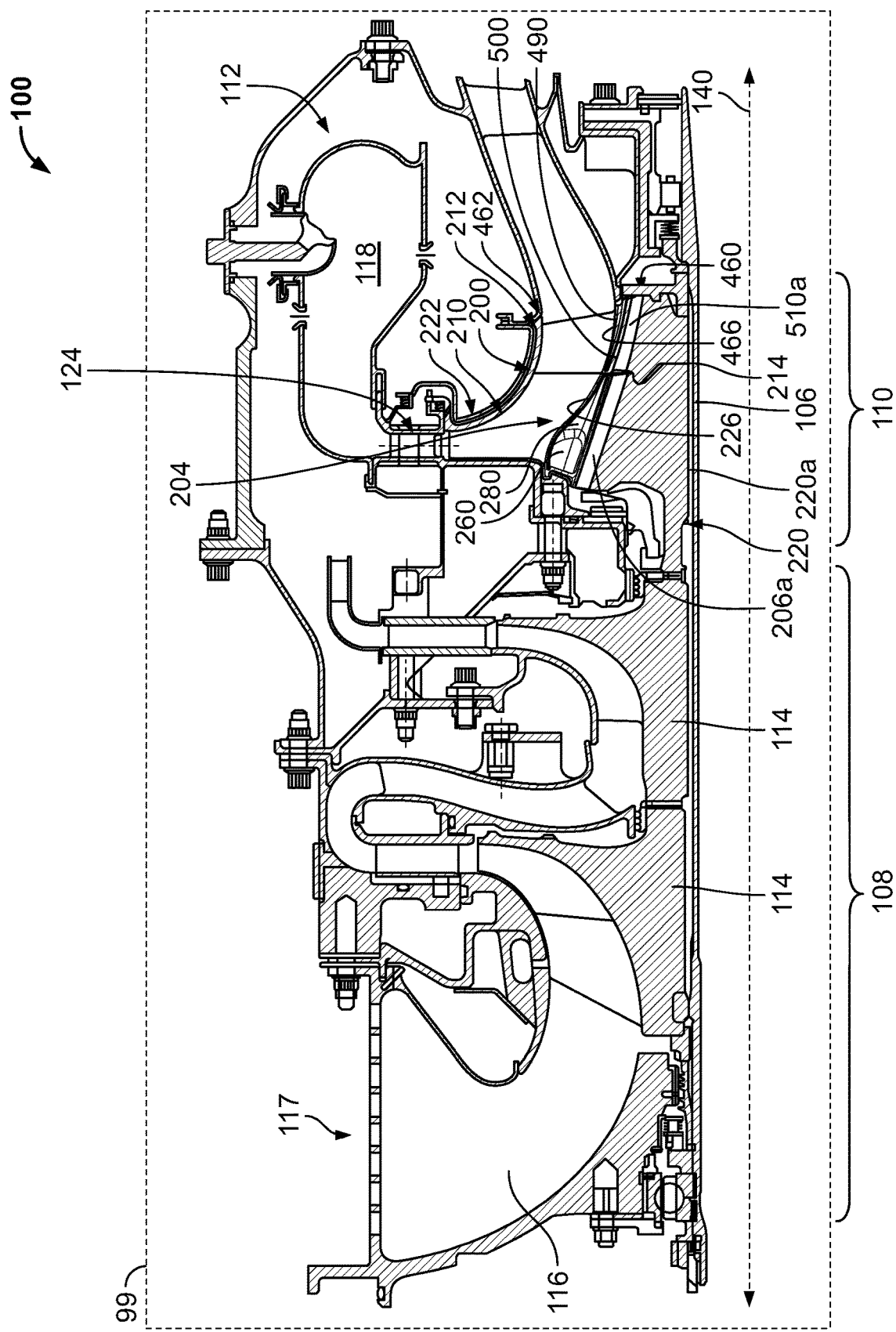
FIG. 1 is a schematic cross-sectional illustration of a gas turbine engine, which includes an exemplary radial turbine rotor in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a radial turbine rotor and the use of the radial turbine rotor for a gas turbine engine described herein is merely one exemplary embodiment according to the present disclosure. In addition, while the radial turbine rotor is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction.

With reference to FIG. 1, a simplified cross-sectional view of an exemplary gas turbine engine 100 is shown with the remaining portion of the gas turbine engine 100 being axisymmetric about a longitudinal axis 140, which also comprises an axis of rotation for the gas turbine engine 100. As will be discussed herein, the gas turbine engine 100 includes a radial turbine rotor 200. The radial turbine rotor 200 enables increased rotational speeds for the gas turbine engine 100 and increased turbine inlet temperatures. In this regard, as will be discussed, the radial turbine rotor 200 includes at least one pocket 202, at least one feather seal slot 204 and optionally, at least one stress relief hole 206 and at least one stress relief slot 456. The at least one pocket 202 provides a mass savings, which reduces stress during the rotation of the radial turbine rotor 200, while thermally isolating the working fluid from a remainder of the radial turbine rotor 200 radially inboard of the flowpath. The at least one feather seal slot 204 allows the use of at least one feather seal to prevent hot gas ingestion into the at least one feather seal slot 204, and reduces thermodynamic cycle losses associated with the radial turbine rotor 200 cooling leakage flow. The optional at least one stress relief hole 206 further reduces stress concentrations associated with the corresponding at least one stress relief slot 456 during operation of the gas turbine engine 100. It should be noted that while the radial turbine rotor 200 is illustrated and described herein as being used with the gas turbine engine 100, which can be included with an auxiliary power unit, the radial turbine rotor 200 can be employed with various types of engines, including, but not limited to, turbofan, turboprop, turboshaft, and turbojet engines, whether deployed onboard an aircraft, watercraft, or ground vehicle (e.g., a tank), included within industrial power generators, or utilized within another platform or application. In this example, the gas turbine engine 100 is employed within an aircraft 99.

In the example shown in FIG. 1, the gas turbine engine 100 is illustrated as a single spool engine. It should be noted that the use of a single spool engine is merely exemplary, as any number of spools can be employed. A tie-shaft 106 extends along an axis of rotation or longitudinal axis 140 of the gas turbine engine 100. In this example, the gas turbine engine 100 includes a compressor section 108, a combustion section 112, and a turbine section 110. In certain examples, the compressor section 108 includes one or more compressors 114, which are mounted to an upstream or forward end of the tie-shaft 106. The compressors 114 are in communication with a compressor section duct 116 to receive airflow from an intake section 117 of the gas turbine engine 100. The compressors 114 pressurize the air in the compressor section duct 116, and the compressor section duct 116 is in communication with the combustion section 112 to deliver the compressed air to a combustion chamber 118 of the combustion section 112.

The combustion section 112 includes the combustion chamber 118. The compressed air from the compressor section 108 is mixed with fuel and ignited to produce combustive gases in the combustion chamber 118. The combustive gases are directed from the combustion chamber 118 to the turbine section 110. The turbine section 110 includes at least one radial turbine rotor 200, which is mounted to an aft end of the tie-shaft 106 as the turbine for the gas turbine engine 100. The turbine section 110 also includes a turbine nozzle 124, which is in fluid communication with the combustion section 112 to receive combustion gases from the combustion chamber 118. The turbine nozzle 124 directs the combustion gases to the radial turbine rotor 200.

The combustion gases drive rotation of the radial turbine rotor 200, which drives the compressors 114. The rotation of the radial turbine rotor 200 also provides power output, which may be utilized in a variety of different manners, depending upon whether the gas turbine engine 100 assumes the form of a turbofan, turboprop, turboshaft, turbojet engine, or an auxiliary power unit, to list but a few examples.

In this example, the radial turbine rotor 200 is axially-split or fabricated from at least two discrete portions, which are separated along a plane orthogonal to the axis of rotation or longitudinal axis 140 and are assembled to produce a completed turbine rotor. It should be noted, however, that the radial turbine rotor 200 may comprise a one-piece or monolithic radial turbine rotor, if desired. The radial turbine rotor 200 includes two halves: a first, forward turbine rotor 210, and a second, aft turbine rotor 212. A second end 452 of forward turbine rotor 210 and a first end 482 of aft turbine rotor 212 abut along a generally annular interface, which resides within the plane generally orthogonal to the axis of rotation or longitudinal axis 140 and which is generally referred to as "split line" 214. The forward turbine rotor 210 and the aft turbine rotor 212 are generally assembled so as to rotate in unison, and may be coupled together via any suitable technique, such as a tie-shaft, mechanical fasteners, a frictional interface, etc. It should be noted, however, that the forward turbine rotor 210 and the aft turbine rotor 212 may also be bonded together, via welding, for example, if desired.

Figure 2:
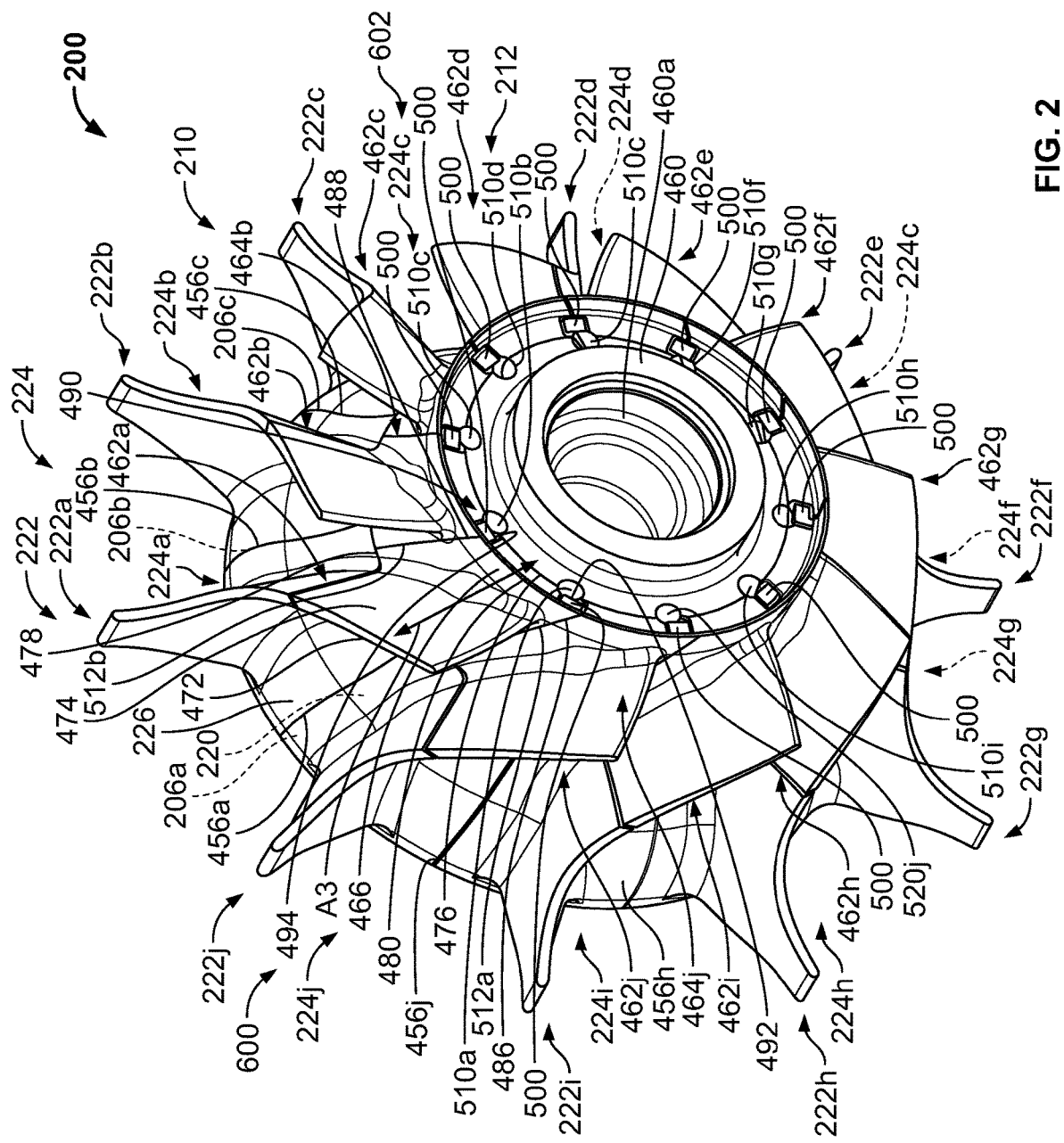
FIG. 2 a rear perspective view of the radial turbine rotor of the gas turbine engine in accordance with various embodiments.

With reference to FIG. 2, the forward turbine rotor 210 includes a first hub or disk 220, a first plurality of blades 222 (i.e., inducer blades) and a first plurality of sectors 224. The first disk 220 is annular about the longitudinal axis 140. In one example, the first disk 220 is substantially one-piece or monolithic, and defines a central bore 220a (FIG. 1) for coupling the forward turbine rotor 210 to the tie-shaft 106 (FIG. 1). Each of the first plurality of blades 222 is coupled to a respective one of the plurality of sectors 224 to form a blade segment. In this example, the forward turbine rotor 210 includes ten blades 222a-j and ten sectors 224a-224j about a perimeter of the first disk 220. As each of the sectors 224a-j and each of the blades 222a-j are substantially similar or the same, the following description of the blade 222a and the sector 224a will be understood to be applicable to the remaining blades 222b-j and sectors 224b-j.

Figure 3:
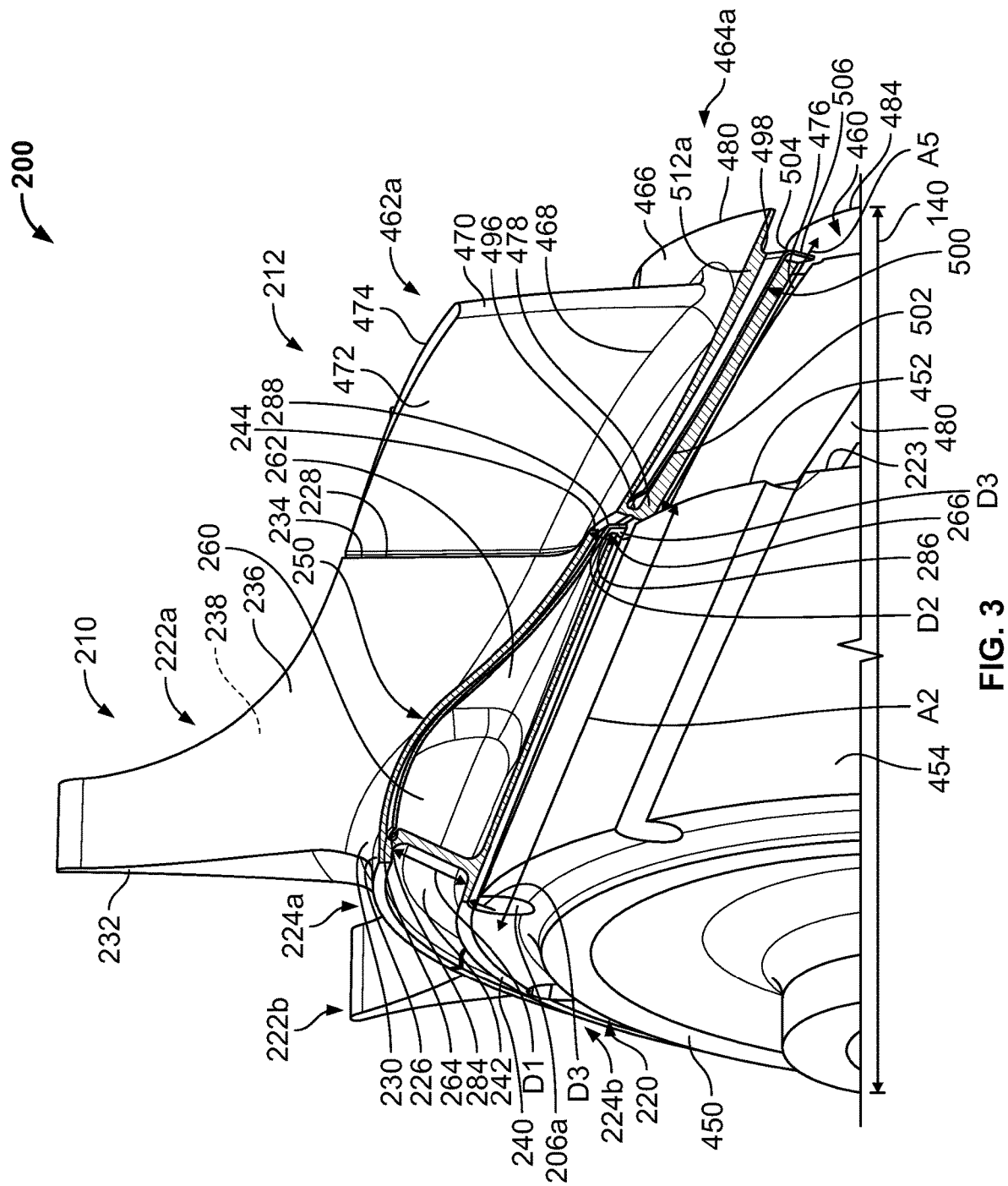
FIG. 3 is a perspective detail view of a portion of the radial turbine rotor with certain blades associated with a forward turbine rotor and certain blades associated with an aft turbine rotor removed for clarity.

The blade 222a is coupled to an outer peripheral surface 226 of the sector 224a. With reference to FIG. 3, the blade 222a has a root 230, a forward end 232, an aft end 234, a first or pressure side 236 and a second or suction side 238. The root 230 is a bottom surface of the blade 222a, or the surface of the blade 222a in contact with the outer peripheral surface 226 of the sector 224a, and couples the blade 222a to the sector 224a. For example, the root 230 is integrally formed with the outer peripheral surface 226 of the sector 224a. The forward end 232 is in communication with the turbine nozzle 124 to receive the high temperature working fluid from the combustion chamber 118 (FIG. 1). The aft end 234 comprises the furthest aft portion of the blade 222a. The aft end 234 cooperates with a respective forward end 228 of the aft turbine rotor 212 to form a substantially continuous airflow guide surface. In one example, the aft end 234 is interlocked with the forward end 228; however, the aft end 234 may be positioned adjacent to the forward end 228 to form a substantially continuous airflow guide surface through the coupling of the forward turbine rotor 210 to the aft turbine rotor 212. The pressure side 236 is substantially opposite the suction side 238. Each of the pressure side 236 and the suction side 238 extend along the blade 222a from the forward end 232 to the aft end 234.

The sector 224a interconnects the blade 222a to the first disk 220. The sector 224a includes the flowpath surface or outer peripheral surface 226, a bond plane or an inner peripheral surface 240, a first forward wall 242 and a second aft wall 244. The outer peripheral surface 226 is coupled to the blade 222a, and forms a guide surface for the working fluid as it flows through the radial turbine rotor 200. The outer peripheral surface 226 extends in a generally curved line axially in cross-section from the first forward wall 242 to the second aft wall 244. The inner peripheral surface 240 is coupled to the first disk 220, and couples the blade 222a to the first disk 220. The inner peripheral surface 240 extends from the first forward wall 242 to the second aft wall 244. The first forward wall 242 interconnects the outer peripheral surface 226 with the inner peripheral surface 240 at a first end 450 of the first disk 220. Thus, the outer peripheral surface 226 is configured to contact the working fluid and the inner peripheral surface 240 is configured to be coupled to the first disk 220. In one example, the first forward wall 242 is recessed relative to the outer peripheral surface 226 and the inner peripheral surface 240 such that forwardmost ends of the outer peripheral surface 226 and the inner peripheral surface 240 extend beyond the first forward wall 242 to reduce stress. The second aft wall 244 interconnects the outer peripheral surface 226 with the inner peripheral surface 240 at a second end 452 of the first disk 220. In one example, the first forward wall 242 extends for a distance D1, which is different and greater than a distance D2 the second aft wall 244 extends.

Figure 4:
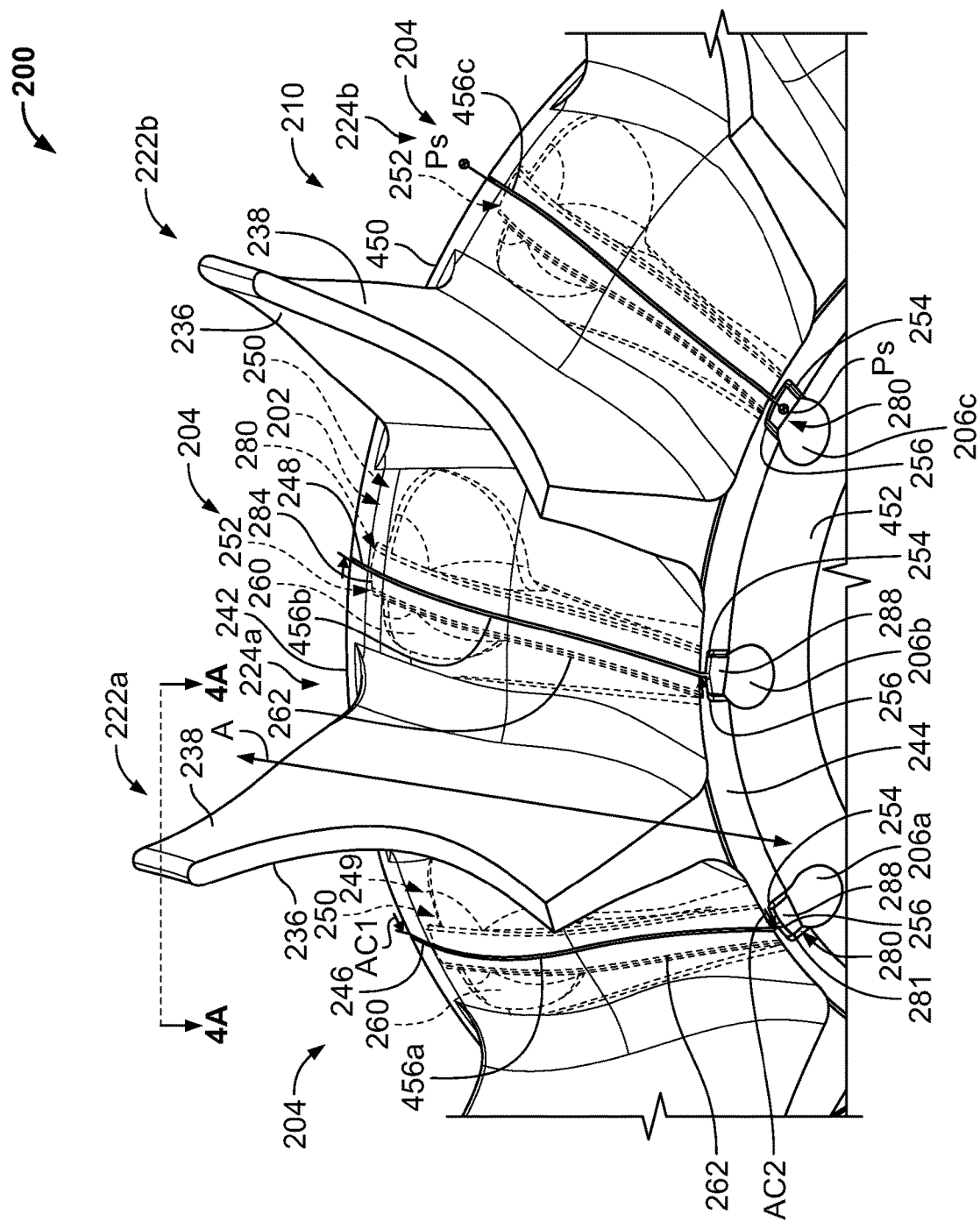
FIG. 4 is a detail rear view of a portion of the forward turbine rotor.

With reference to FIG. 4, the sector 224a extends in a circumferential direction from a first side 246 to an opposite second side 248. Each of the first side 246 and the second side 248 interconnect the first forward wall 242 and the second aft wall 244. The sector 224a defines the at least one pocket 202 between the inner peripheral surface 240 and the outer peripheral surface 226. In this example, the at least one pocket 202 includes a first pocket 250 and a second pocket 252. Each of the at least one feather seal slot 204 includes a first feather seal recess 254 and a second feather seal recess 256. The first feather seal recess 254 cooperates with the second feather seal recess 256 of an adjacent sector 224 to define the feather seal slot 204. The first pocket 250 cooperates with the second pocket 252 of an adjacent sector 224 to define an enlarged recess, void or space within the radial turbine rotor 200 (FIG. 4A).

The first pocket 250 and the first feather seal recess 254 are defined along the first side 246 proximate the pressure side 236 of the blade 222a, and the second pocket 252 and the second feather seal recess 256 are defined along the second side 248 proximate the suction side 238 of the blade 222a. In this example, the first pocket 250 and the second pocket 252 are defined on opposite sides of an axis A defined through the sector 224a and extend axially along the axis A. In one example, the first pocket 250 may be larger than or have a greater volume than the second pocket 252 due to the position of the blade 222a. Thus, the first pocket 250 has a first volume, which is different and greater than a second volume of the second pocket 252. In this example, the blade 222a is positioned off-center on the sector 224a, which enables the first pocket 250 to have a larger or greater volume than the second pocket 252. The first feather seal recess 254 and the second feather seal recess 256 are symmetric relative to a mid-plane Ps defined along the stress relief slot 456 that separates the sectors 224, with an end of each of the first feather seal recess 254 and the second feather seal recess 256 at the second end 452 defined by an offset from the second end 452. The first pocket 250 and the second pocket 252 are recesses, voids or spaces defined within the sector 224a, which provide for mass reduction and thermally isolate the first disk 220 from the high temperature working fluid that flows along the outer peripheral surface 226. In one example, the first pocket 250 and the second pocket 252 include an enlarged forward recess portion 260 that tapers to an aft recess portion 262. The enlarged forward recess portion 260 is defined proximate the forward end 232 and the aft recess portion 262 extends from the enlarged forward recess portion 260 to the aft end 234.

In one example, with reference to FIG. 3, the first side 246 and the second side 248 each extend for a distance D3, the enlarged forward recess portion 260 extends aft of the first forward wall 242 for about 50% of the distance D3, and the aft recess portion 262 extends for the remainder of the distance D3. The enlarged forward recess portion 260 generally extends from the respective first side 246 or second side 248 about 40% of a circumferential distance inward to the blade 222a. With reference back to FIG. 4, the enlarged forward recess portion 260 is generally bulbous or ovoid in shape, and extends from the respective first side 246 or second side 248 circumferentially inward toward the blade 222a. In one example, the sector 224a has a first arc length AC1 defined along the first forward wall 242, and a second arc length AC2 defined along the second aft wall 244. The first arc length AC1 is different and greater than the second arc length AC2. The enlarged forward recess portion 260 extends from the respective first side 246 or second side 248 for about 40% of the arc length AC1. The enlarged forward recess portion 260 is defined radially outboard of the stress relief hole 206a to proximate the outer peripheral surface 226 or flowpath surface. The aft recess portion 262 extends from the respective first side 246 or second side 248 for about 5% of the arc length AC2. With reference back to FIG. 3, the aft recess portion 262 is in fluid communication with the enlarged forward recess portion 260 and extends from the enlarged forward recess portion 260 to the second aft wall 244. The aft recess portion 262 follows the curvature of the outer peripheral surface 226, and tapers to the second aft wall 244.

Figure 4A:
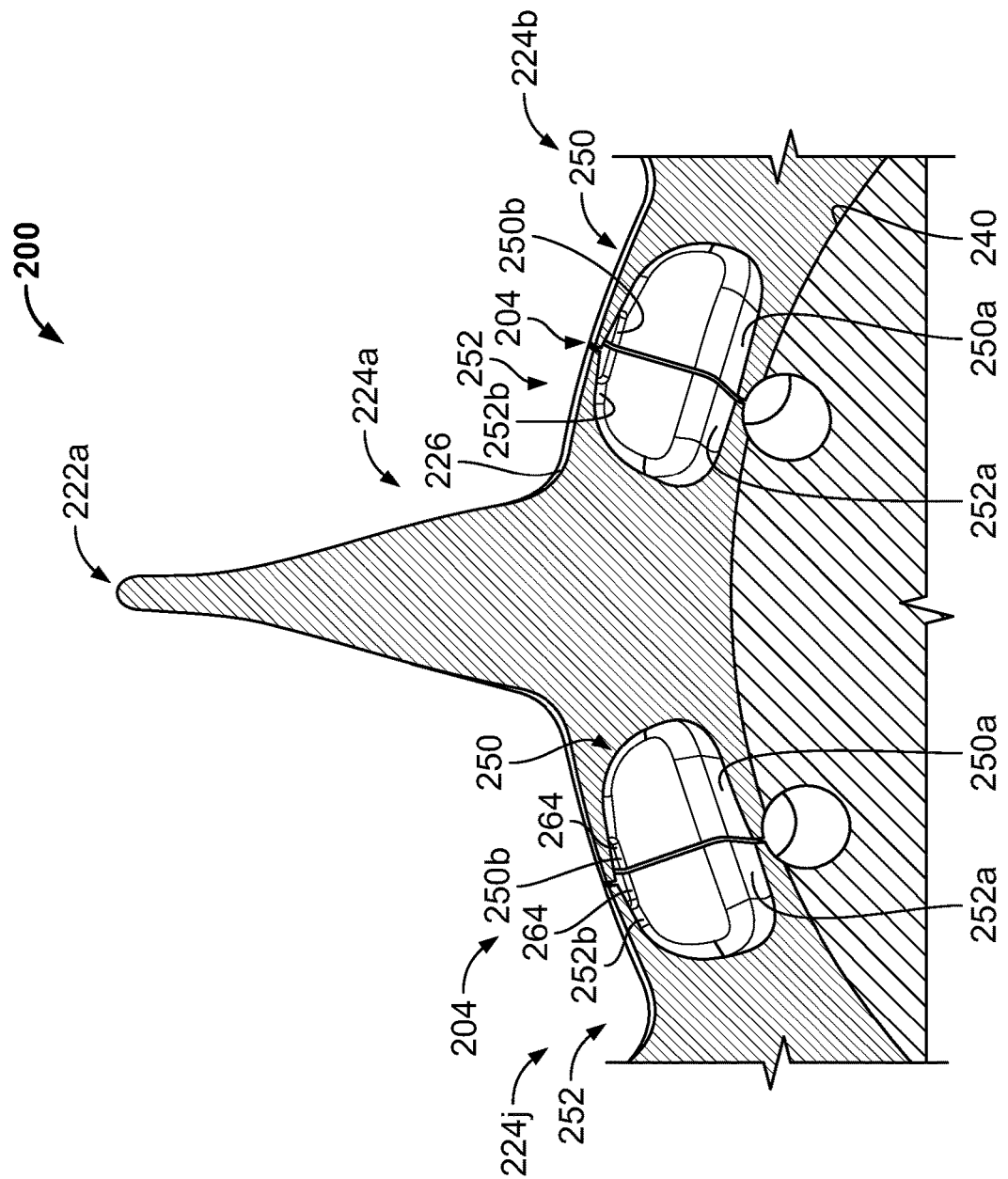
FIG. 4A is a cross-sectional view of a portion of the forward turbine rotor, taken along line 4A-4A in FIG. 4 in which feather seals are removed for clarity.

Generally, with reference to FIG. 4A, a bottom surface 250a, 252a of the respective pocket 250, 252 is substantially an offset from the inner peripheral surface 240 a minimum distance, for example, about 0.040 inches (in.) to about 0.200 inches (in.) based on manufacturing tolerances and stress. An upper surface 250b, 252b of the respective pocket 250, 252 is substantially an offset from the outer peripheral surface 226 a minimum distance, for example, about 0.030 inches (in.) to about 0.100 inches (in.) based on manufacturing tolerances, and it may be tapered circumferentially or in a circumferential direction normal to the radial and the axial direction due to stress and manufacturing (casting "draft"). The axial extent of the pocket 250, 252 or length of the pocket 250, 252 in the axial direction is limited by stress. In this example, the stress is small enough that the pocket 250, 252 may extend to the second end 452 of the forward turbine rotor 210. The further the extent of the pocket 250, 252, additional weight reduction is possible. Generally, the pockets 250, 252 are as large as possible while keeping stress within a predetermined acceptable value.

Each of the first feather seal recess 254 and the second feather seal recess 256 are defined from the first forward wall 242 to the second aft wall 244. The first feather seal recess 254 and the second feather seal recess 256 include a first recess end 264 and an opposite second recess end 266. The first recess end 264 is defined at the first forward wall 242 proximate or adjacent to the outer peripheral surface 226, and the second recess end 266 is defined at the second aft wall 244 proximate or adjacent to the outer peripheral surface 226. Generally, the first feather seal recess 254 and the second feather seal recess 256 are defined adjacent to or proximate the outer peripheral surface 226 to form the respective feather seal slot 204 to seal along the outer peripheral surface 226 between adjacent sectors 224a-224j. In this example, the first feather seal recess 254 and the second feather seal recess 256 are in communication with the enlarged forward recess portion 260 and the aft recess portion 262 of the respective pocket 250, 252. In one example, the aft recess portion 262 narrows toward the second aft wall 244 such that the aft recess portion 262 and the respective first feather seal recess 254 and the second feather seal recess 256 are substantially coextensive toward the second aft wall 244 and at the second recess end 266.

With reference back to FIG. 4, the first feather seal recess 254 cooperates with the second feather seal recess 256 of an adjacent sector 224 to receive a feather seal 280. The feather seal 280 is composed of a metal, including, but not limited to cobalt or nickel based alloys; and may be cast, formed, molded, punched, etc. In this example, the feather seal 280 is curved to follow the curvature of the first feather seal recess 254 and the second feather seal recess 256, respectively (as shown in FIG. 3). The feather seal 280 has a first seal end 284 and an opposite second seal end 286. The first seal end 284 is coupled to or received in the respective first feather seal recess 254 and second feather seal recess 256 at the first recess end 264, and the second seal end 286 is coupled to or received in the second recess end 266 of the respective first feather seal recess 254 and second feather seal recess 256. In one example, the second seal end 286 includes a bent tab 288 to assist in retaining the feather seal 280 in the respective first feather seal recess 254 and second feather seal recess 256. As shown in FIG. 4, the first feather seal recess 254 of the sector 224a cooperates with the second feather seal recess 256 of the adjacent sector 224j to form the feather seal slot 204 and retain the feather seal 280 between the adjacent sectors 224a, 224j. Similarly, the second feather seal recess 256 of the sector 224a cooperates with the first feather seal recess 254 of the adjacent sector 224b to form the feather seal slot 204 and retain the feather seal 280 between the adjacent sectors 224a, 224b. Thus, generally, the first feather seal recess 254 and the second feather seal recess 256 of adjacent sectors 224a-j cooperate to form the feather seal slot 204 to retain the feather seal 280 between adjacent sectors 224a-j to reduce cooling fluid leakage between adjacent sectors 224a-j and into the high temperature working fluid.

It should be noted that in other embodiments, the pockets 250, 252 and the feather seal recess 254, 256 of the forward turbine rotor 210 may be configured differently to receive the feather seal 280 to reduce leakage between adjacent sectors 224a-j while also reducing mass and thermally isolating the first disk 220 from the high temperature working fluid. For example, with reference to FIG. 5, a sector 224a' of a plurality of sectors 224a'-j' is shown. As the sector 224a' includes components that are the same or similar to components of the sector 224a discussed with regard to FIGS. 1-4, the same reference numerals will be used to denote the same or similar components. As each of the sectors 224a'-j' are substantially similar or the same, the following description of the sector 224a' will be understood to be applicable to the remaining sectors 224b'-j'.

Figure 6:
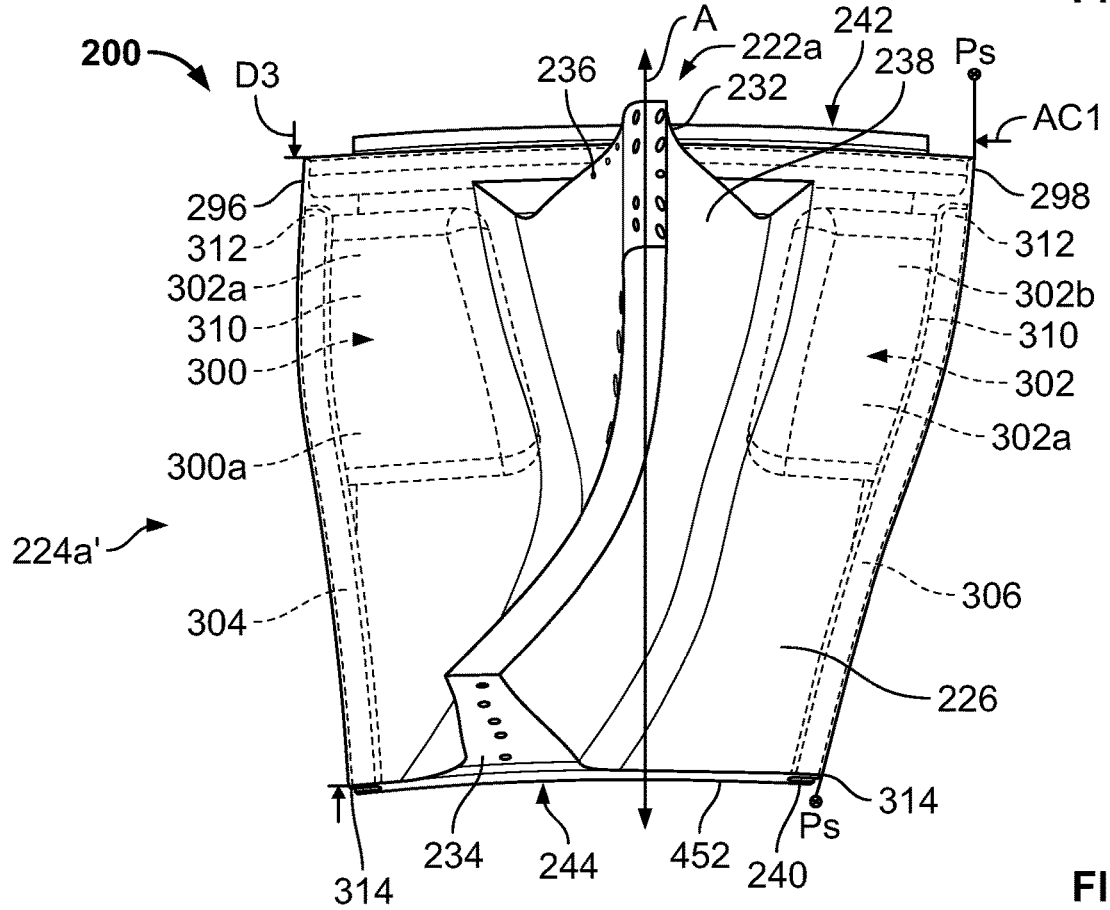
FIG. 6 is a top detail view of the sector of the forward turbine rotor of FIG. 5.

The sector 224a' interconnects the blade 222a to the first disk 220. The sector 224a' includes the outer peripheral surface 226, the inner peripheral surface 240, the first forward wall 242 and the second aft wall 244 (FIG. 6). With reference to FIG. 6, the sector 224a' extends in a circumferential direction from a first side 296 to an opposite second side 298. Each of the first side 296 and the second side 298 interconnect the first forward wall 242 and the second aft wall 244. The sector 224a' defines a first pocket 300, a second pocket 302, a first feather seal recess 304 and a second feather seal recess 306 between the inner peripheral surface 240 and the outer peripheral surface 226. The first feather seal recess 304 cooperates with the second feather seal recess 306 of an adjacent sector 224' to define a feather seal slot to retain the feather seal 280. The first pocket 300 and the first feather seal recess 304 are defined along the first side 296 proximate the pressure side 236 of the blade 222a, and the second pocket 302 and the second feather seal recess 306 are defined along the second side 298 proximate the suction side 238 of the blade 222a. In this example, the first pocket 300 and the second pocket 302 are defined on opposite sides of the axis A defined through the sector 224a' and extend axially along the axis A. In one example, the first pocket 300 may be larger than or have a greater volume than the second pocket 302 due to the position of the blade 222a. In this example, the blade 222a is positioned off-center on the sector 224a', which enables the first pocket 300 to have a larger or greater volume than the second pocket 302. Thus, the first pocket 300 has a first volume, which is different and greater than a second volume of the second pocket 302. The first feather seal recess 304 and the second feather seal recess 306 are symmetric relative to the mid-plane Ps defined along the stress relief slot 456 that separates the sectors 224', with an end of each of the first feather seal recess 304 and the second feather seal recess 306 at the second end 452 defined by an offset from a face of the second end 452. The first pocket 300 and the second pocket 302 are recesses, voids or spaces defined within the sector 224a', which provide for mass reduction and thermally isolate the first disk 220 from the high temperature working fluid that flows along the outer peripheral surface 226. The first pocket 300 and the second pocket 302 include an enlarged forward recess portion 310. The enlarged forward recess portion 310 is defined proximate the forward end 232 and extends toward the aft end 234.

Figure 5:
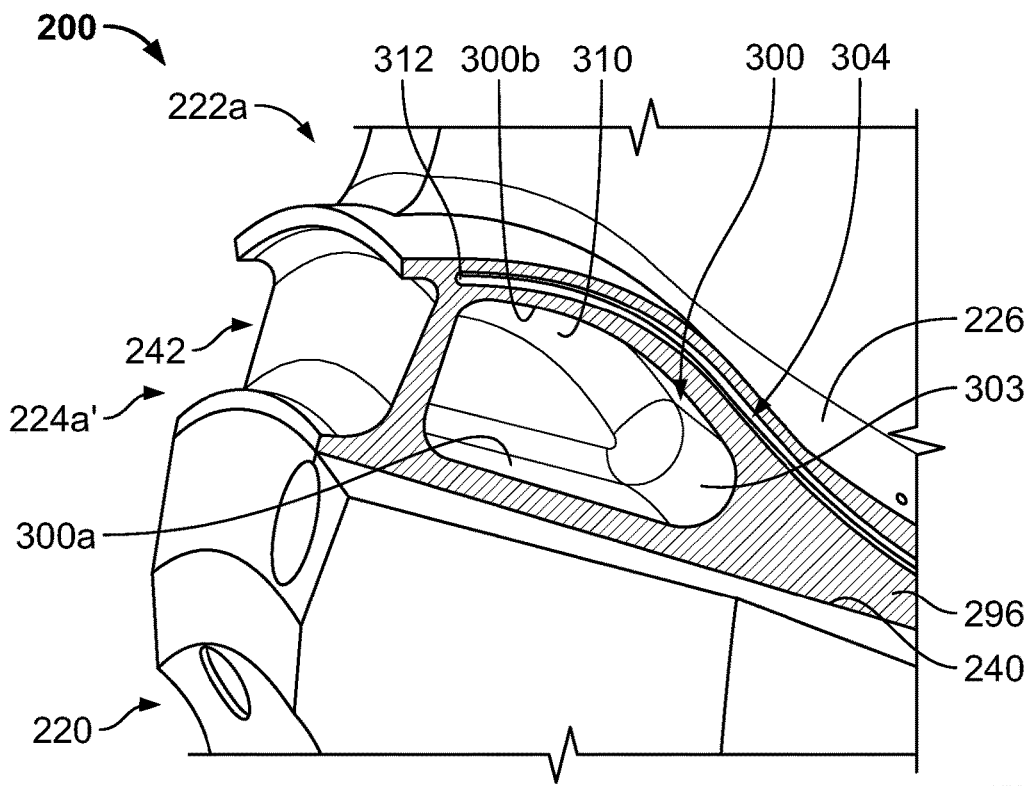
FIG. 5 is a cross-sectional view of another exemplary pocket defined in an exemplary sector associated with the forward turbine rotor.

In one example, with reference to FIG. 6, the first side 296 and the second side 298 each extend for the distance D3, and the enlarged forward recess portion 310 extends aft of the first forward wall 242 for about 50% of the distance D3. The enlarged forward recess portion 310 is generally bulbous or ovoid in shape, and extends from the respective first side 296 or second side 298 circumferentially inward toward the blade 222a. The enlarged forward recess portion 310 has a substantially D-shaped cross-section (FIG. 5). In one example, the sector 224a' has the first arc length AC1 defined along the first forward wall 242. The enlarged forward recess portion 260 extends from the respective first side 296 or second side 298 for about 40% of the arc length AC1.

Generally, a bottom surface 300a, 302a of the respective pocket 300, 302 is substantially an offset from the inner peripheral surface 240 a minimum distance, for example, about 0.040 inches (in.) to about 0.200 inches (in.) based on manufacturing tolerances and stress. An upper surface 300b, 302b of the respective pocket 300, 302 is substantially an offset from the outer peripheral surface 226 a minimum distance, for example, about 0.030 inches (in.) to about 0.100 inches (in.) based on manufacturing tolerances, and it may be tapered circumferentially or in a circumferential direction normal to the radial and the axial direction due to stress and manufacturing (casting "draft"). With reference to FIG. 5, the axial extent of the pocket 300, 302 or length of the pocket 300, 302 in the axial direction is limited by stress in a fillet 303. In this example, the stress is such that the pocket 300, 302 extends to the fillet 303. Generally, the pockets 250, 252 are as large as possible while keeping stress within a predetermined acceptable value.

Each of the first feather seal recess 304 and the second feather seal recess 306 are defined from the first forward wall 242 to the second aft wall 244. The first feather seal recess 304 and the second feather seal recess 306 include a first recess end 312 and an opposite second recess end 314. The first recess end 312 is defined at the first forward wall 242 proximate or adjacent to the outer peripheral surface 226, and the second recess end 314 is defined at the second aft wall 244 proximate or adjacent to the outer peripheral surface 226. Generally, the first feather seal recess 304 and the second feather seal recess 306 are defined adjacent to or proximate the outer peripheral surface 226 and cooperate to form a feather seal slot to receive the feather seal 280 to form a seal along the outer peripheral surface 226 between adjacent sectors 224'. In this example, the first feather seal recess 304 and the second feather seal recess 306 are defined radially outboard of the pockets 300, 302 so as to be discrete from the pockets 300, 302. This may result in easier insertion and coupling of the feather seal 280 to the feather seal slot defined by adjacent ones of the feather seal recesses 304, 306. The feather seal recesses 304, 306 of adjacent sectors 224a'-j' cooperate to define the feather seal slot that receives the feather seal 280 to reduce cooling fluid leakage between the adjacent sectors 224a'-j' into the high temperature working fluid that flows along the outer peripheral surface 226, which thereby reduces aerodynamic losses.

It should be noted that in other embodiments, the pockets 250, 252 and the feather seal recesses 254, 256 of the forward turbine rotor 210 may be configured differently to receive the feather seal 280 to reduce leakage between adjacent sectors 224a-j while also reducing mass and thermally isolating the first disk 220 from the high temperature working fluid. For example, with reference to FIG. 7, a sector 224a" of a plurality of sectors 224a"-j" is shown. As the sector 224a" includes components that are the same or similar to components of the sector 224a discussed with regard to FIGS. 1-4, the same reference numerals will be used to denote the same or similar components. In addition, as each of the sectors 224 are substantially similar or the same, the following description of the sector 224a" will be understood to be applicable to the remaining sectors 224b"-j".

Figure 8:
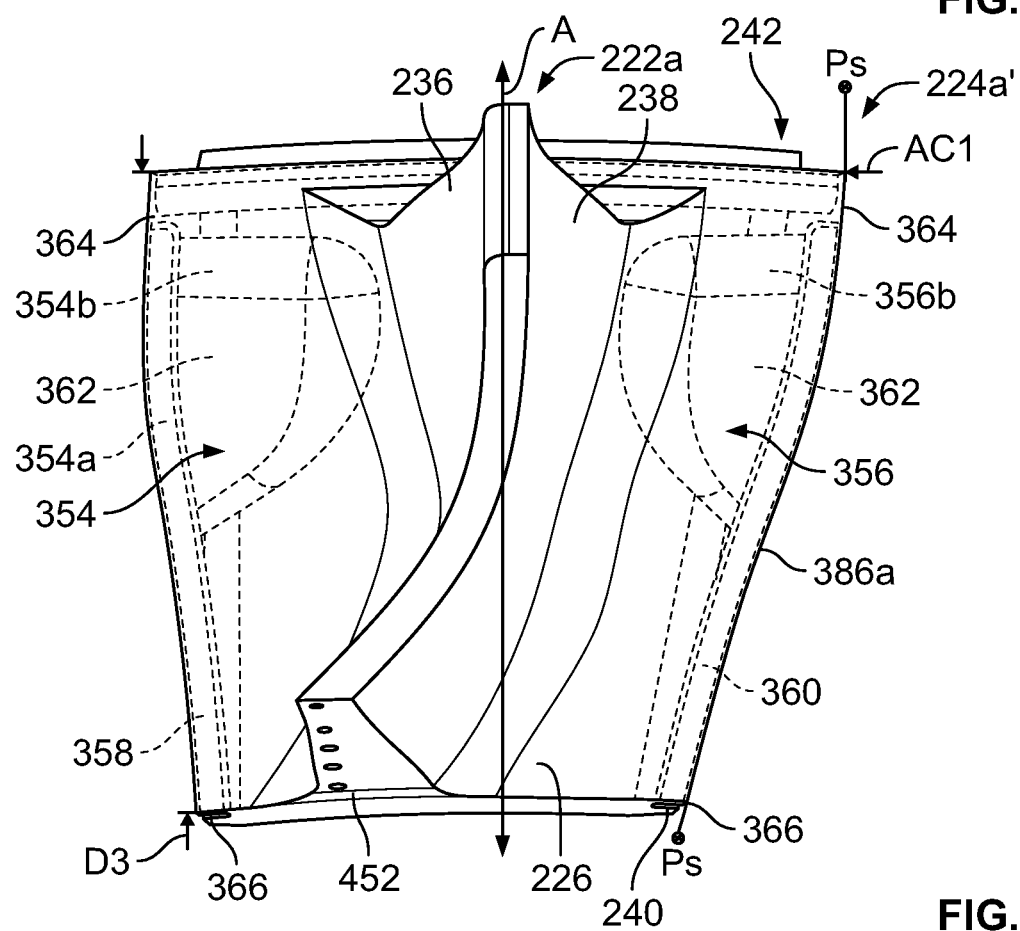
FIG. 8 is a top detail view of the sector of the forward turbine rotor of FIG. 7.

The sector 224a" interconnects the blade 222a to the first disk 220. The sector 224a" includes the outer peripheral surface 226, the inner peripheral surface 240, the first forward wall 242 and the second aft wall 244 (FIG. 8). With reference to FIG. 8, the sector 224a" extends in a circumferential direction from a first side 350 to an opposite second side 352. Each of the first side 350 and the second side 352 interconnect the first forward wall 242 and the second aft wall 244. The sector 224a" defines a first pocket 354, a second pocket 356, a first feather seal recess 358 and a second feather seal recess 360 between the inner peripheral surface 240 and the outer peripheral surface 226. The first pocket 354 and the first feather seal recess 358 are defined along the first side 350 proximate the pressure side 236 of the blade 222a, and the second pocket 356 and the second feather seal recess 360 are defined along the second side 352 proximate the suction side 238 of the blade 222a. In this example, the first pocket 354 and the second pocket 356 are defined on opposite sides of the axis A defined through the sector 224a" and extend axially along the axis A. In one example, the first pocket 354 may be larger than or have a greater volume than the second pocket 356 due to the position of the blade 222a. In this example, the blade 222a is positioned off-center on the sector 224a", which enables the first pocket 354 to have a larger or greater volume than the second pocket 356. Thus, the first pocket 354 has a first volume, which is different and greater than a second volume of the second pocket 356. The first feather seal recess 358 and the second feather seal recess 360 are symmetric relative to the mid-plane Ps defined along the stress relief slot 456 that separates the sectors 224", with an end of each of the first feather seal recess 358 and the second feather seal recess 360 at the second end 452 defined by an offset from the second end 452. The first pocket 354 and the second pocket 356 are recesses, voids or spaces defined within the sector 224a", which provide for mass reduction and thermally isolate the first disk 220 from the high temperature working fluid that flows along the outer peripheral surface 226. The first pocket 354 and the second pocket 356 include an enlarged forward recess portion 362. The enlarged forward recess portion 362 is defined proximate the forward end 232 and extends toward the aft end 234.

In one example, with reference to FIG. 8, the first side 350 and the second side 352 each extend for the distance D3, and the enlarged forward recess portion 362 extends aft of the first forward wall 242 for about 50% of the distance D3. The enlarged forward recess portion 310 is generally bulbous or ovoid in shape, and extends from the respective first side 350 or second side 352 circumferentially inward toward the blade 222a. In one example, the sector 224a" has the first arc length AC1 defined along the first forward wall 242. The enlarged forward recess portion 362 extends from the respective first side 350 or second side 352 for about 40% of the arc length AC1.

Figure 7:
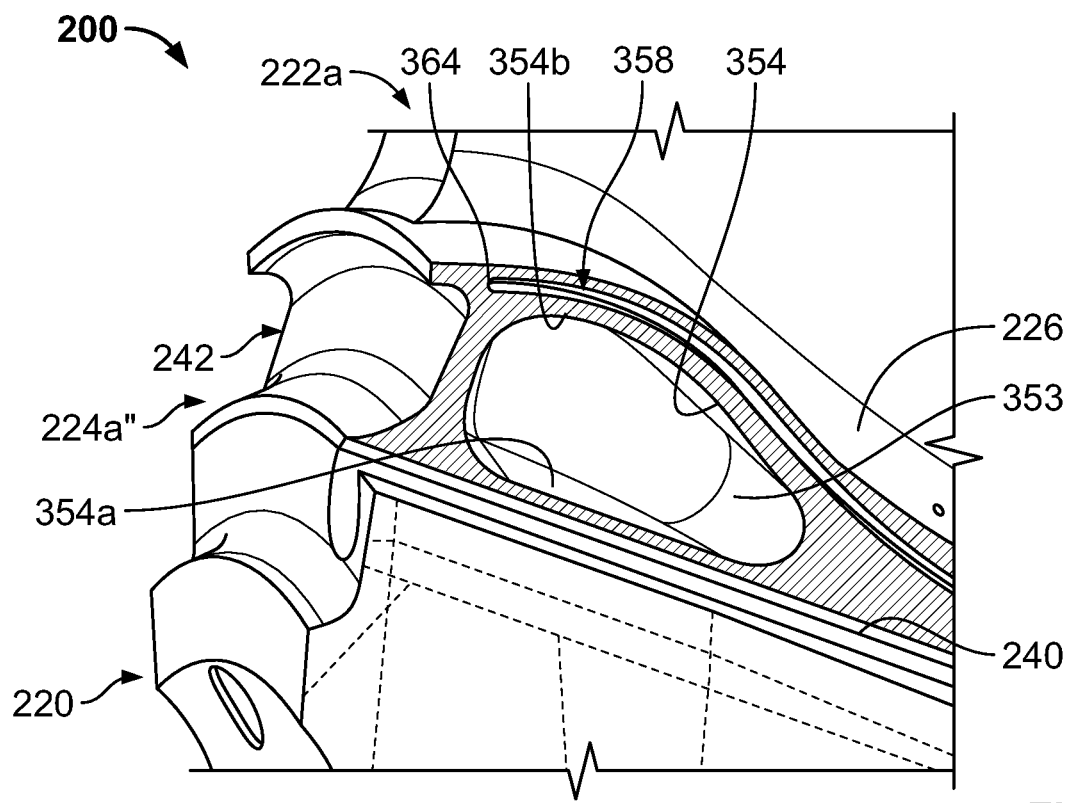
FIG. 7 is a cross-sectional view of another exemplary pocket defined in an exemplary sector associated with the forward turbine rotor.

Generally, a bottom surface 354a, 356a of the respective pocket 354, 356 is substantially an offset from the inner peripheral surface 240 a minimum distance, for example, about 0.040 inches (in.) to about 0.200 inches (in.) based on manufacturing tolerances and stress. An upper surface 354b, 356b of the respective pocket 354, 356 is substantially an offset from the outer peripheral surface 226 a minimum distance, for example, about 0.030 inches (in.) to about 0.100 inches (in.) based on manufacturing tolerances, and it may be tapered circumferentially or in a circumferential direction normal to the radial and the axial direction due to stress and manufacturing (casting "draft"). With reference to FIG. 7, the axial extent of the pocket 354, 356 or length of the pocket 354, 356 in the axial direction is limited by stress in a fillet 353. In this example, the stress is such that the pocket 354, 356 extends to the fillet 353. Generally, the pockets 354, 356 are as large as possible while keeping stress within a predetermined acceptable value.

Each of the first feather seal recess 358 and the second feather seal recess 360 are defined from the first forward wall 242 to the second aft wall 244. The first feather seal recess 358 and the second feather seal recess 360 include a first recess end 364 and an opposite second recess end 366. The first recess end 364 is defined at the first forward wall 242 proximate or adjacent to the outer peripheral surface 226, and the second recess end 366 is defined at the second aft wall 244 proximate or adjacent to the outer peripheral surface 226. Generally, the first feather seal recess 358 and the second feather seal recess 360 are defined adjacent to or proximate the outer peripheral surface 226 and cooperate to form a feather seal slot that receives the feather seal 280 to form a seal along the outer peripheral surface 226 between adjacent sectors 224a"-j". In this example, the first feather seal recess 358 and the second feather seal recess 360 are defined radially outboard of the pockets 354, 356 so as to be discrete from the pockets 354, 356. The feather seal recesses 358, 360 each cooperate to define the feather seal slot to receive the feather seal 280 to reduce cooling fluid leakage between the adjacent sectors 224a"-j" into the high temperature working fluid that flows along the outer peripheral surface 226, which thereby reduces aerodynamic losses.

Figure 9:
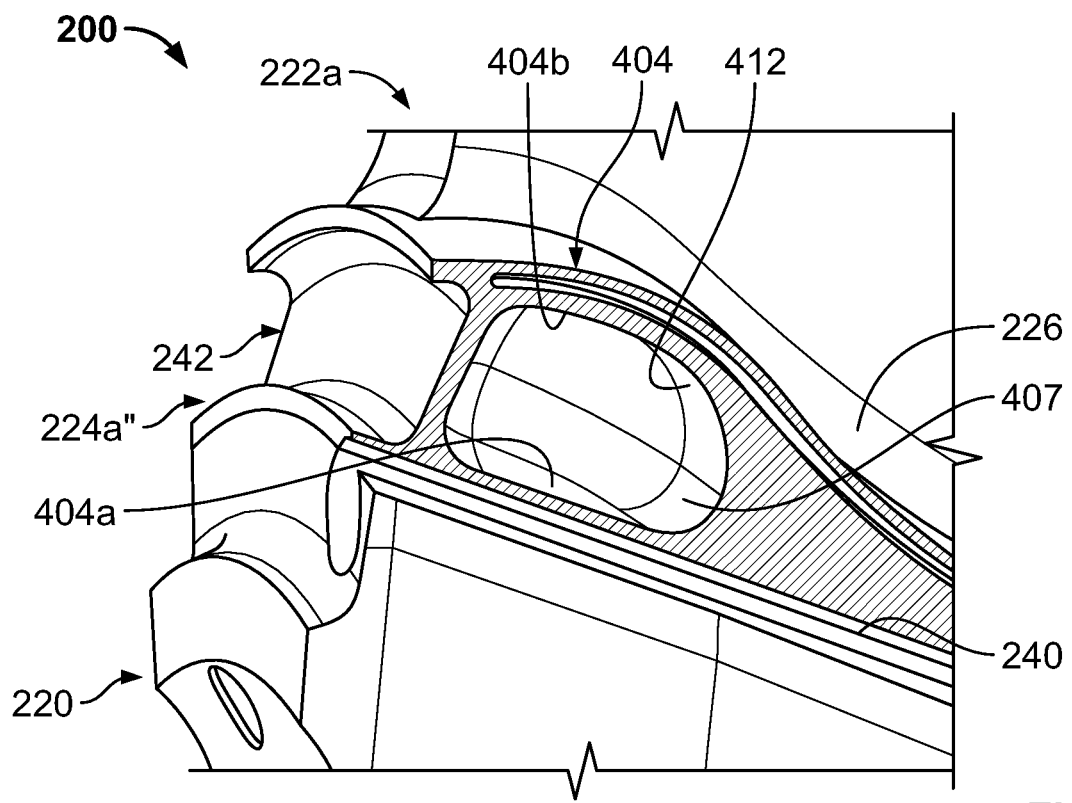
FIG. 9 is a cross-sectional view of another exemplary pocket defined in an exemplary sector associated with the forward turbine rotor.

It should be noted that in other embodiments, the pockets 250, 252 and the feather seal recesses 254, 256 of the forward turbine rotor 210 may be configured differently to receive the feather seal 280 to reduce leakage between adjacent sectors 224a-j while also reducing mass and thermally isolating the first disk 220 from the high temperature working fluid. For example, with reference to FIG. 9, a sector 224a''' of a plurality of sectors 224a'''-j''' is shown. As the sector 224a''' includes components that are the same or similar to components of the sector 224a discussed with regard to FIGS. 1-4, the same reference numerals will be used to denote the same or similar components. In addition, as each of the sectors 224a'''-j''' are substantially similar or the same, the following description of the sector 224a''' will be understood to be applicable to the remaining sectors 224b'''-j'''.

Figure 10:
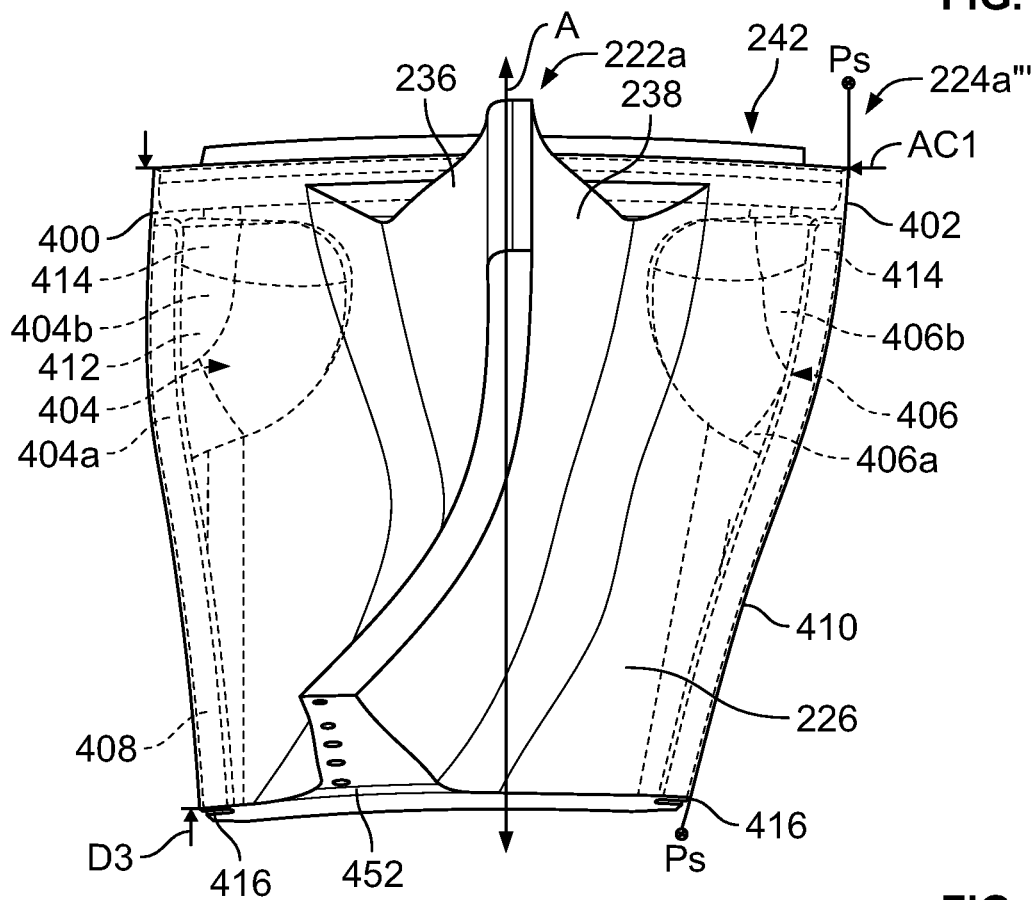
FIG. 10 is a top detail view of the sector of the forward turbine rotor of FIG. 9.

The sector 224a''' interconnects the blade 222a to the first disk 220. The sector 224a''' includes the outer peripheral surface 226, the inner peripheral surface 240, the first forward wall 242 and the second aft wall 244 (FIG. 10). With reference to FIG. 10, the sector 224a''' extends in a circumferential direction from a first side 400 to an opposite second side 402. Each of the first side 400 and the second side 402 interconnect the first forward wall 242 and the second aft wall 244. The sector 224a''' defines a first pocket 404, a second pocket 406, a first feather seal recess 408 and a second feather seal recess 410 between the inner peripheral surface 240 and the outer peripheral surface 226. The first pocket 404 and the first feather seal recess 408 are defined along the first side 400 proximate the pressure side 236 of the blade 222a, and the second pocket 406 and the second feather seal recess 410 are defined along the second side 402 proximate the suction side 238 of the blade 222a. In this example, the first pocket 404 and the second pocket 406 are defined on opposite sides of the axis A defined through the sector 224a''' and extend axially along the axis A. In one example, the first pocket 404 may be larger than or have a greater volume than the second pocket 406 due to the position of the blade 222a. In this example, the blade 222a is positioned off-center on the sector 224a''', which enables the first pocket 404 to have a larger or greater volume than the second pocket 406. Thus, the first pocket 404 has a first volume, which is different and greater than a second volume of the second pocket 406. The first feather seal recess 408 and the second feather seal recess 410 are symmetric relative to the mid-plane Ps defined along the stress relief slot 456 that separates the sectors 224''', with an end of each of the first feather seal recess 408 and the second feather seal recess 410 at the second end 452 defined by an offset from the second end 452. The first pocket 404 and the second pocket 406 are recesses, voids or spaces defined within the sector 224a''', which provide for mass reduction and thermally isolate the first disk 220 from the high temperature working fluid that flows along the outer peripheral surface 226. The first pocket 404 and the second pocket 406 include an enlarged forward recess portion 412. The enlarged forward recess portion 412 is defined proximate the forward end 232 and extends toward the aft end 234.

In one example, with reference to FIG. 10, the first side 400 and the second side 402 each extend for the distance D3, and the enlarged forward recess portion 412 extends aft of the first forward wall 242 for about 50% of the distance D3. The enlarged forward recess portion 412 is generally bulbous or ovoid in shape, and extends from the respective first side 400 or second side 402 circumferentially inward toward the blade 222a. In one example, the sector 224a''' has the first arc length AC1 defined along the first forward wall 242. The enlarged forward recess portion 412 extends from the respective first side 400 or second side 402 for about 40% of the arc length AC1. In this example, the enlarged forward recess portion 412 has a larger radius toward the aft end 234, which may lead to a lower stress concentration.

Generally, a bottom surface 404a, 406a of the respective pocket 404, 406 is substantially an offset from the inner peripheral surface 240 a minimum distance, for example, about 0.040 inches (in.) to about 0.200 inches (in.) based on manufacturing tolerances and stress. An upper surface 404b, 406b of the respective pocket 404, 406 is substantially an offset from the outer peripheral surface 226 a minimum distance, for example, about 0.030 inches (in.) to about 0.100 inches (in.) based on manufacturing tolerances, and it may be tapered circumferentially or in a circumferential direction normal to the radial and the axial direction due to stress and manufacturing (casting "draft"). With reference to FIG. 10, the axial extent of the pocket 404, 406 or length of the pocket 404, 406 in the axial direction is limited by stress in a fillet 407. In this example, the stress is such that the pocket 404, 406 extends to the fillet 407 and the pockets 404, 406 are shorter. Due to the stresses, the fillet 407 is a compound fillet, with two radii in the fillet 407. Generally, the pockets 404, 406 are as large as possible while keeping stress within a predetermined acceptable value.

Each of the first feather seal recess 408 and the second feather seal recess 410 are defined from the first forward wall 242 to the second aft wall 244. The first feather seal recess 408 and the second feather seal recess 410 include a first recess end 414 and an opposite second recess end 416. The first recess end 414 is defined at the first forward wall 242 proximate or adjacent to the outer peripheral surface 226, and the second recess end 416 is defined at the second aft wall 244 proximate or adjacent to the outer peripheral surface 226. Generally, the first feather seal recess 408 and the second feather seal recess 410 are defined adjacent to or proximate the outer peripheral surface 226 and cooperate to define a feather seal slot to receive the feather seal 280 to form a seal along the outer peripheral surface 226 between adjacent sectors 224''. In this example, the first feather seal recess 408 and the second feather seal recess 410 are defined radially outboard of the pockets 404, 406 so as to be discrete from the pockets 404, 406. The feather seal recesses 408, 410 cooperate to form the feather seal slot to receive the feather seal 280 to reduce cooling fluid leakage between the adjacent sectors 224a'''-j''' into the high temperature working fluid that flows along the outer peripheral surface 226, which thereby reduces aerodynamic losses.

With reference to back to FIG. 4, the forward turbine rotor 210 includes at least one stress relief hole 206 and at least one stress relief slot 456. As will be discussed, the at least one stress relief hole 206 is defined at an end of the at least one stress relief slot 456 to reduce stress concentrations at the at least one stress relief slot 456. The at least one stress relief slot 456 reduces rim compressive stresses. The at least one stress relief hole 206, in this example, comprises a plurality of stress relief holes 206a-j. Generally, each stress relief hole 206a-j corresponds to one of the sectors 224a-j. Thus, in this example, the forward turbine rotor 210 includes ten stress relief holes 206a-j. As each of the stress relief holes 206a-j is substantially similar or the same, the following description of the stress relief hole 206a will be understood to be applicable to the remaining stress relief holes 206b-j. The stress relief hole 206a extends through the first disk 220 and the sector 224a from the first end 450 of the forward turbine rotor 210 to the opposite second end 452 of the forward turbine rotor 210. The stress relief hole 206a is substantially cylindrical, and is defined through an outer perimeter 454 of the first disk 220 and through a portion of the inner peripheral surface 240 of the sector 224a. In other embodiments, the stress relief hole 206a may be defined through the first disk 220 so as to be disposed beneath the sector 224a. In addition, in certain embodiments, the stress relief hole 206a may receive a cooling fluid, which may be directed through the forward turbine rotor 210 to provide additional cooling for the forward turbine rotor 210. Generally, the stress relief hole 206a is defined through the first disk 220 and the sector 224a after the coupling of the sector 224a to the first disk 220. The stress relief hole 206a is defined by machining, such as drilling, etc. and comprises a straight hole, which extends along and is symmetric to an axis A2. The axis A2 is oblique to the longitudinal axis 140 of the gas turbine engine 100.

In this example, with reference back to FIG. 4, the stress relief hole 206a is intersected by and defined at an end of a stress relief slot 456a. In this example, each of the stress relief holes 206a-j includes a corresponding stress relief slot 456 such that the forward turbine rotor 210 includes ten stress relief slots 456a-j corresponding to a respective one of the stress relief holes 206a-j. The stress relief slots 456a-j reduce compressive stress along the flowpath. As each of the stress relief slots 456a-j is substantially similar or the same, the description of the stress relief slot 456a will be understood to be applicable to the remaining stress relief slots 456b-j. The stress relief slot 456a is defined through the sector 224a and is in fluid communication with the stress relief hole 206a. The stress relief slot 456a is defined to extend through the sector 224a from the outer peripheral surface 226 to the stress relief hole 206a to reduce rim compressive stress. The stress relief slot 456a extends from the first end 450 of the forward turbine rotor 210 to the second end 452 of the forward turbine rotor 210. In this example, the stress relief slot 456a and the stress relief hole 206a are defined along the axis A2 (FIG. 3) such that the stress relief slot 456a is between adjacent blades 222a-j. In other embodiments, the stress relief slot 456a and the stress relief hole 206a may be defined along the axis A2 (FIG. 3) so that the stress relief slot 456a is cut through one of the blades 222a-j. The stress relief slot 456a is also defined through the first disk 220 and the sector 224a after the coupling of the sector 224a to the first disk 220, and may be formed with the machining of the stress relief hole 206a. The stress relief slot 456a is defined by machining, such as wire electrical discharge machining, etc. The stress relief slot 456a provides additional stress relief for the forward turbine rotor 210 and enables thermal expansion. It should be noted that alternatively, the forward turbine rotor 210 may include J-shaped stress relief slots or anchor slots, if desired.

With reference to FIG. 2, the aft turbine rotor 212 is coupled to rotate with the forward turbine rotor 210. The aft turbine rotor 212 includes a second disk 460, second blades or a second plurality of blades 462 (i.e., exducer blades) and second sectors or a second plurality of sectors 464. The second disk 460 is substantially annular about the longitudinal axis 140 (FIG. 1). In one example, the second disk 460 is substantially one-piece or monolithic, and defines a bore 460a, for coupling the tie-shaft 106 to the aft turbine rotor 212, and thus, the radial turbine rotor 200 (FIG. 1). The aft turbine rotor 212 includes a number of sectors 464a-j that corresponds to a number of the blades 462a-j, such that each sector 464a-j of the second disk 460 corresponds to a respective one of the blades 462a-j to form a blade segment. In this example, the aft turbine rotor 212 includes ten blades 462a-j and ten sectors 464a-j about a perimeter of the aft turbine rotor 212. As each of the sectors 464a-j and each of the blades 462a-j are substantially similar, the following description of the sector 464a and the blade 462a will be understood to be applicable to the remaining sectors 464b-j and blades 462b-j.

The blade 462a is coupled to an outer peripheral surface 466 of the sector 464a. With reference to FIG. 3, the blade 462a has a root 468, the forward end 228, an aft end 470, a first or pressure side 472 and a second or suction side 474. The root 468 is a bottom surface of the blade 462a, or the surface of the blade 462a in contact with the outer peripheral surface 466 of the sector 464a and couples the blade 462a to the sector 464a. For example, the root 468 is integrally formed with the outer peripheral surface 466 of the sector 464a. It should be understood that various other techniques may be employed to couple the blade 462a to the sector 464a. The forward end 228 cooperates with a respective aft end 234 of the forward turbine rotor 210 to form a substantially continuous airflow guide surface when the forward turbine rotor 210 is coupled to the aft turbine rotor 212. The aft end 470 comprises the distalmost portion of the blade 462a. The pressure side 472 is substantially opposite the suction side 474. Each of the pressure side 472 and the suction side 474 extend along the blade 462a from the forward end 228 to the aft end 470.

The sector 464a interconnects the blade 462a to the second disk 460. The sector 464a includes the outer peripheral surface 466, an inner peripheral surface 476, a forward wall 478 and an aft wall 480. The outer peripheral surface 466 is coupled to the blade 462a, and forms a guide surface for the high temperature working fluid as it flows through the radial turbine rotor 200. The outer peripheral surface 466 and the inner peripheral surface 476 each extend from the forward wall 478 to the aft wall 480. The inner peripheral surface 476 is coupled to the second disk 460, and couples the blade 462a to the second disk 460. Thus, the outer peripheral surface 466 is configured to contact the working fluid and the inner peripheral surface 476 is configured to be coupled to the second disk 460. The forward wall 478 interconnects the outer peripheral surface 466 with the inner peripheral surface 476 at the first end 482 of the second disk 460. The aft wall 480 interconnects the outer peripheral surface 466 with the inner peripheral surface 476 at a second end 484 of the second disk 460.

With reference to FIG. 2, the sector 464a extends in a circumferential direction from a first side 486 to an opposite second side 488. Each of the first side 486 and the second side 488 interconnect the forward wall 478 and the aft wall 480. The sector 464a defines at least one feather seal slot 490 between the inner peripheral surface 476 and the outer peripheral surface 466. In this example, the at least one feather seal slot 490 includes a first feather seal recess 492 and a second feather seal recess 494. The first feather seal recess 492 is defined along the first side 486 proximate the pressure side 472 of the blade 462a, and the second feather seal recess 494 is defined along the second side 488 proximate the suction side 474 of the blade 462a. In this example, the first feather seal recess 492 and the second feather seal recess 494 are also mostly symmetric relative to an axis A3 defined through the center of the sector 464a.

Each of the first feather seal recess 492 and the second feather seal recess 494 are defined from proximate the forward wall 478 to the aft wall 480. The first feather seal recess 492 and the second feather seal recess 494 each include a first recess end 496 and an opposite second recess end 498 (FIG. 3). With reference to FIG. 3, the first recess end 496 is defined at the forward wall 478 proximate or adjacent to the outer peripheral surface 466, and the second recess end 498 is defined at the aft wall 480 proximate or adjacent to the outer peripheral surface 466. Generally, the first feather seal recess 492 and the second feather seal recess 494 are defined adjacent to or proximate the outer peripheral surface 466 and cooperate to form the feather seal slot 490 to receive the feather seal 500 to form a seal along the outer peripheral surface 466 between adjacent sectors 464a-464j. In this example, with reference back to FIG. 3, the first feather seal recess 492 and the second feather seal recess 494 are offset from, misaligned or non-coplanar with the first feather seal recess 254 and the second feather seal recess 256 of the forward turbine rotor 210. It should be noted that in other embodiments, the first feather seal recess 492 and the second feather seal recess 494 may be coplanar with the first feather seal recess 254 and the second feather seal recess 256.

With reference back to FIG. 2, the first feather seal recess 492 and the second feather seal recess 494 cooperate to form the feather seal slot 490 to receive a respective feather seal 500. The feather seal 500 is composed of a metal, including, but not limited to cobalt or nickel based alloys; and may be cast, formed, molded, punched, etc. In this example, with reference back to FIG. 3, the feather seal 500 is predominately straight to correspond with the shape of the first feather seal recess 492 and the second feather seal recess 494, respectively (as shown in FIG. 3). The feather seal 500 has a first seal end 502 and an opposite second seal end 504. The first seal end 502 is coupled to or received in the respective first feather seal recess 492 and second feather seal recess 494 at the first recess end 496, and the second seal end 504 is coupled to or received in the second recess end 498. In one example, the second seal end 504 includes a bent tab 506 to assist in retaining the feather seal 500 in the respective first feather seal recess 492 and second feather seal recess 494. As shown in FIG. 2, the first feather seal recess 492 of the sector 464a cooperates with the second feather seal recess 494 of the sector 464j to retain the feather seal 500 between the adjacent sectors 464a, 464j. Similarly, the second feather seal recess 494 of the sector 464a cooperates with the first feather seal recess 492 of the sector 464b to define the feather seal slot 490 to retain the feather seal 500 between the adjacent sectors 464a, 464b. Thus, generally, the first feather seal recess 492 and the second feather seal recess 494 of adjacent sectors 464a-j cooperate to form the feather seal slot 490 to retain the feather seal 500 between adjacent sectors 464a-j to reduce leakage between adjacent sectors 464a-j.

The aft turbine rotor 212 includes at least one stress relief hole 510 and at least one stress relief slot 512. As will be discussed, the at least one stress relief hole 510 is defined at an end of the at least one stress relief slot 512 to reduce stress concentrations at the at least one stress relief slot 512. The at least one stress relief slot 512 reduces rim compressive stresses. The at least one stress relief hole 510, in this example, comprises a plurality of stress relief holes 510a-j. Generally, each stress relief hole 510a-j corresponds to one of the sectors 464a-j. Thus, in this example, the aft turbine rotor 212 includes ten stress relief holes 510a-j. With reference to FIG. 3, in this example, the stress relief holes 510a-j are misaligned, offset or not coaxial with the stress relief holes 206a-j of the forward turbine rotor 210. It should be noted that in other embodiments, the stress relief holes 206a-j and the stress relief holes 510a-j may be coaxially aligned. As each of the stress relief holes 510a-j is substantially similar or the same, the following description of the stress relief hole 510a will be understood to be applicable to the remaining stress relief holes 510b-j.

The stress relief hole 510a extends through the second disk 460 and the sector 464a from the first end 482 of the aft turbine rotor 212 to the second end 484 of the aft turbine rotor 212. The stress relief hole 510a is substantially cylindrical, and is defined through an outer perimeter 454 of the second disk 460 and through a portion of the inner peripheral surface 476 of the sector 464a. In other embodiments, the stress relief hole 510a may be defined through the second disk 460 so as to be disposed beneath the sector 464a. In addition, in certain embodiments, the stress relief hole 510a may receive a cooling fluid, which may be directed through the aft turbine rotor 212 to provide additional cooling for the aft turbine rotor 212. Generally, the stress relief hole 510a is defined through the second disk 460 and the sector 464a after the coupling of the sector 464a to the second disk 460. The stress relief hole 510a is defined by machining, such as drilling, etc. and comprises a straight hole, which extends along and is symmetric to an axis A5. The axis A5 is oblique to the longitudinal axis 140 of the gas turbine engine 100.

In this example, with reference back to FIG. 2, the stress relief hole 510a is intersected by and defined at an end of a stress relief slot 512a. In this example, each of the stress relief holes 510a-j includes a corresponding stress relief slot 512 such that the aft turbine rotor 212 includes ten stress relief slots 512a-j corresponding to a respective one of the stress relief holes 510a-j. As each of the stress relief slots 512a-j is substantially similar or the same, the description of the stress relief slot 512a will be understood to be applicable to the remaining stress relief slots 512b-j. The stress relief slot 512a is defined through the sector 464a and is in fluid communication with the stress relief hole 510a. With reference to FIG. 3, the stress relief slot 512a is defined to extend through the sector 464a from the outer peripheral surface 466 to the stress relief hole 510a defined in the inner peripheral surface 476 to reduce rim compressive stress. The stress relief slot 512a extends from the first end 482 of the aft turbine rotor 212 to the second end 484 of the aft turbine rotor 212. In this example, the stress relief slot 512a and the stress relief hole 510a are defined along the axis A5 so that the stress relief slot 512a is between adjacent blades 462a-j (FIG. 2). In other embodiments, the stress relief slot 512a and the stress relief hole 510a may be defined such that the stress relief slot 512a is cut through one of the blades 462a-j. The stress relief slot 512a is also defined through the second disk 460 and the sector 464a after the coupling of the sector 464a to the second disk 460, and may be formed with the machining of the stress relief hole 510a. The stress relief slot 512a is defined by machining, such as wire electrical discharge machining, etc. The stress relief slot 512a provides additional stress relief for the aft turbine rotor 212.

Figure 11:
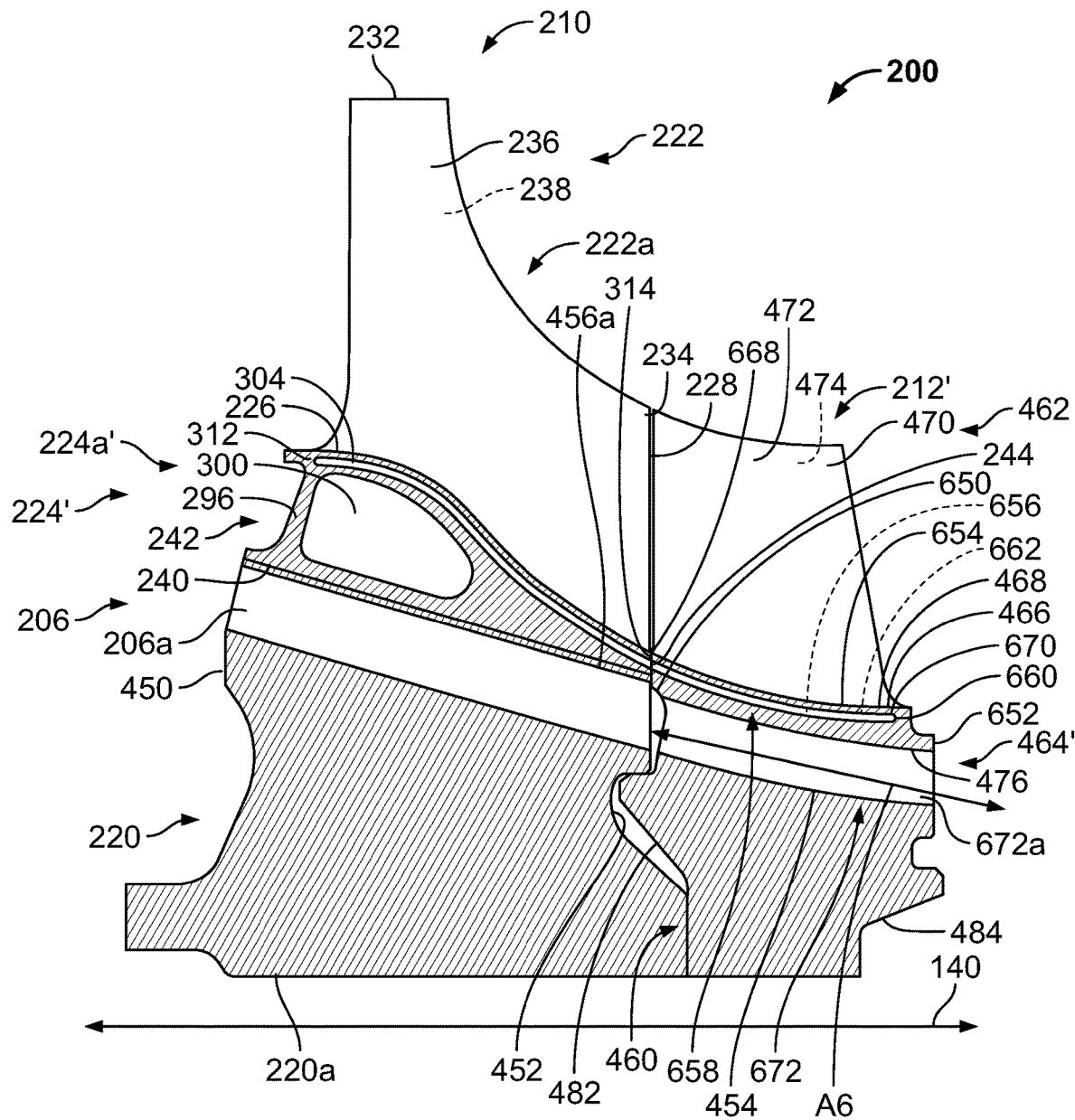
FIG. 11 is a cross-sectional view of the forward turbine rotor and another exemplary aft turbine rotor for use with the gas turbine engine.

It should be noted that in other embodiments, the feather seal recesses 492, 494 and the stress relief holes 510a-j of the aft turbine rotor 212 may be configured differently to receive the feather seal 500 to reduce leakage between adjacent sectors 464a-j and to reducing mass and stress in the second disk 460. For example, with reference to FIG. 11, a cross-section of the forward turbine rotor 210 and an aft turbine rotor 212' is shown. As the forward turbine rotor 210 and an aft turbine rotor 212' include components that are the same or similar to components of the forward turbine rotor 210 and an aft turbine rotor 212 discussed with regard to FIGS. 1-10, the same reference numerals will be used to denote the same or similar components. The forward turbine rotor 210 and the aft turbine rotor 212' are substantially axi-symmetric about the longitudinal axis 140.

The forward turbine rotor 210 includes the first hub or disk 220, the first plurality of blades 222 (i.e., inducer blades) and the first plurality of the sectors 224'. In this example, although not shown, the forward turbine rotor 210 includes the ten blades 222a-j and ten sectors 224a'-j'. As discussed, the sector 224a' interconnects the blade 222a to the first disk 220. The sector 224a' includes the outer peripheral surface 226, the inner peripheral surface 240, the first forward wall 242 and the second aft wall 244. The sector 224a' defines the first pocket 300, the second pocket 302 (not shown), the first feather seal recess 304 and the second feather seal recess 306 (not shown) between the inner peripheral surface 240 and the outer peripheral surface 226. The first pocket 300 and the first feather seal recess 304 are defined along the first side 296 proximate the pressure side 236 of the blade 222a, and the second pocket 302 and the second feather seal recess 306 are defined along the second side 298 proximate the suction side 238 of the blade 222a.

Each of the first feather seal recess 304 and the second feather seal recess 306 are defined from the first forward wall 242 to the second aft wall 244. The first recess end 312 is defined at the first forward wall 242 proximate or adjacent to the outer peripheral surface 226, and the second recess end 314 is defined at the second aft wall 244 proximate or adjacent to the outer peripheral surface 226. As discussed, the first feather seal recess 304 and the second feather seal recess 306 are defined adjacent to or proximate the outer peripheral surface 226 and cooperate to form a feather seal slot to receive the feather seal 280 to form a seal along the outer peripheral surface 226 between adjacent sectors 224'. The first feather seal recess 304 and the second feather seal recess 306 are defined radially outboard of the pockets 300, 302 so as to be discrete from the pockets 300, 302. The feather seal recesses 304, 306 cooperate to define the feather seal slot to receive the feather seal 280 to reduce leakage between the adjacent sectors 224a'-j'.

The forward turbine rotor 210 includes the plurality of stress relief holes 206a-j. Generally, each stress relief hole 206a-j corresponds to one of the sectors 224a'-j'. The stress relief hole 206a extends through the first disk 220 and the sector 224a' from a first end 450 of the forward turbine rotor 210 to an opposite second end 452 of the forward turbine rotor 210. The stress relief hole 206a is intersected by the stress relief slot 456a.

The aft turbine rotor 212' is coupled to rotate with the forward turbine rotor 210. The aft turbine rotor 212' includes the second disk 460, the second plurality of blades 462 (i.e., exducer blades) and a second plurality of sectors 464'. The second disk 460 is substantially annular about the longitudinal axis 140 (FIG. 1). The aft turbine rotor 212' includes a number of sectors 464a'-j' that corresponds to a number of the blades 462a-j, such that each sector 464a'-j' of the second disk 460 corresponds to a respective one of the blades 462a-j. In this example, the aft turbine rotor 212' includes ten blades 462a'-j' and ten sectors 464a-j (not shown). As each of the sectors 464a-j and each of the blades 462a-j are substantially similar, the following description of the sector 464a' and the blade 462a will be understood to be applicable to the remaining sectors 464b'-j' and blades 462b-j.

The blade 462a is coupled to the outer peripheral surface 466 of the sector 464a'. The blade 462a has the root 468, the forward end 228, the aft end 470, the pressure side 472 and the suction side 474. The sector 464a' interconnects the blade 462a to the second disk 460. The sector 464a' includes the outer peripheral surface 466, the inner peripheral surface 476, a forward wall 650 and an aft wall 652. The forward wall 650 interconnects the outer peripheral surface 466 with the inner peripheral surface 476 at the first end 482 of the second disk 460. The aft wall 480 interconnects the outer peripheral surface 466 with the inner peripheral surface 476 at the second end 484 of the second disk 460.

The sector 464a' extends in a circumferential direction from a first side 654 to an opposite second side 656. Each of the first side 654 and the second side 656 interconnect the forward wall 650 and the aft wall 652. The sector 464a' defines at least one feather seal recess 658 between the inner peripheral surface 476 and the outer peripheral surface 466. In this example, the at least one feather seal recess 658 includes a first feather seal recess 660 and a second feather seal recess 662. The first feather seal recess 660 is defined along the first side 654 proximate the pressure side 472 of the blade 462a, and the second feather seal recess 662 is defined along the second side 656 proximate the suction side 474 of the blade 462a. In this example, the first feather seal recess 660 and the second feather seal recess 662 are aligned with the first feather seal recess 304 and the second feather seal recess 306 of the forward turbine rotor 210. It should be noted that in other embodiments, the first feather seal recess 660 and the second feather seal recess 662 may be misaligned with the first feather seal recess 304 and the second feather seal recess 306 of the forward turbine rotor 210.

Each of the first feather seal recess 660 and the second feather seal recess 662 are defined from the forward wall 650 to the aft wall 652. The first feather seal recess 660 and the second feather seal recess 662 each include a first recess end 668 and an opposite second recess end 670. The first recess end 668 is defined at the forward wall 650 proximate or adjacent to the outer peripheral surface 466, and the second recess end 670 is defined at the aft wall 652 proximate or adjacent to the outer peripheral surface 466. Generally, the first feather seal recess 660 and the second feather seal recess 662 are defined adjacent to or proximate the outer peripheral surface 466 and cooperate to form a feather seal slot to receive a feather seal (not shown) to form a seal along the outer peripheral surface 466 between adjacent sectors 464a'-464j'. The first feather seal recess 660 and the second feather seal recess 662 of adjacent sectors 464a'-j' cooperate to retain the feather seal between adjacent sectors 464a'-j' to reduce leakage between adjacent sectors 464a'-j'.

The aft turbine rotor 212' includes at least one stress relief hole 672 and at least one stress relief slot 512. As will be discussed, the at least one stress relief hole 672 is defined at an end of the at least one stress relief slot 512 to reduce stress concentrations at the at least one stress relief slot 512. The at least one stress relief slot 512 reduces rim compressive stresses. The at least one stress relief hole 672, in this example, comprises a plurality of stress relief holes 672a-j. Generally, each stress relief hole 672a-j corresponds to one of the sectors 464a'-j'. Thus, in this example, the aft turbine rotor 212' includes ten stress relief holes 672a-j. In this example, the stress relief holes 672a-j are coincident with the stress relief holes 206a-j of the forward turbine rotor 210 where the stress relief holes 672a-j meet with the stress relief holes 206a-j between the forward turbine rotor 210 and the aft turbine rotor 212. In other examples, the stress relief holes 672a-j may be misaligned with the stress relief holes 206a-j of the forward turbine rotor 210. As each of the stress relief holes 672a-j is substantially similar or the same, the following description of the stress relief hole 672a will be understood to be applicable to the remaining stress relief holes 672b-j.

The stress relief hole 672a extends through the second disk 460 and the sector 464a' from the first end 482 of the aft turbine rotor 212' to the second end 484 of the aft turbine rotor 212'. The stress relief hole 672a is substantially cylindrical, and is defined through the outer perimeter 454 of the second disk 460 and through a portion of the inner peripheral surface 476 of the sector 464a'. Generally, the stress relief hole 672a is defined through the second disk 460 and the sector 464a' after the coupling of the sector 464a' to the second disk 460. The stress relief hole 672a is defined by machining, such as drilling, etc. and comprises a straight hole, which extends along and is symmetric to an axis A6. The axis A6 is oblique to the longitudinal axis 140 of the gas turbine engine 100.

In this example, the stress relief hole 672a is intersected by and defined at the end of the stress relief slot 512a. In this example, each of the stress relief holes 672a-j includes a corresponding stress relief slot 512 such that the aft turbine rotor 212' includes ten stress relief slots 512a-j corresponding to a respective one of the stress relief holes 672a-j. The stress relief slot 512a is defined through the sector 464a' and is in fluid communication with the stress relief hole 672a. The stress relief slot 512a is defined to extend through the sector 464a' from the outer peripheral surface 466 to the stress relief hole 672a defined in the inner peripheral surface 476. The stress relief slot 512a extends from the first end 482 of the aft turbine rotor 212' to the second end 484 of the aft turbine rotor 212'. In this example, the stress relief slot 512a and the stress relief hole 672a are defined along the axis A6 so that the stress relief slot 512a is between adjacent blades 462a-j. In other embodiments, the stress relief slot 512a and the stress relief hole 672a may be defined such that the stress relief slot 512a is cut through one of the blades 462a-j.

In this example, with reference to FIG. 2, the forward turbine rotor 210 and the aft turbine rotor 212, 212' each comprise a dual alloy turbine rotor, such that the first disk 220 and the second disk 460 are composed of a first metal or metal alloy, and the first plurality of blades 222a-j and the second plurality of blades 462a-j are each formed of a second metal or metal alloy, which is different from the first metal or metal alloy. In one example, the first metal or metal alloy is a nickel-based superalloy, having a relatively high resistance to cyclic fatigue and moderate thermal tolerance and the second metal or metal alloy is an oxidation and stress rupture resistant, single crystal, nickel-based superalloy, such as the nickel-based superalloy commercially identified as "CMSX 4" or the nickel-based superalloy commercially identified as "SC180." It should be noted, however, that the first disk 220 and the second disk 460 need not be formed of the same material, but rather, the first disk 220 and the second disk 460 may each be formed of a distinct metal or metal alloy, which is distinct from the second metal or metal alloy. Moreover, as discussed previously herein, the first disk 220 and the blades 222a-j, and/or the second disk 460 and the blades 462a-j may be composed of the same materials (single metal or metal alloy).

In order to manufacture the forward turbine rotor 210, in one example, with reference to FIG. 2, the blades 222a-j and the sectors 224a-j, 224a'-j', 224a"-j", 224a'''-j''' may be formed using investment casting, additive manufacturing, etc. In one example, each of the blades 222a-j is integrally formed with the respective sector 224a-j, 224a'-j', 224a"-j", 224a'''-j'''. The blades 462a-j and the sectors 464a-j, 464a'-j' of the aft turbine rotor 212, 212' may be formed using investment casting, additive manufacturing, etc. In one example, each of the blades 462a-j is integrally formed with the respective sector 464a-j, 464a'-j'. The sectors 224a-j, 224a'-j', 224a"-j", 224a'''-j''' are formed with the pockets 250, 252, 300, 302, 354, 356, 404, 406, the first feather seal recess 254 and the second feather seal recess 256. The sectors 464a-j, 464a'-j' are formed with the first feather seal recess 492, 660 and the second feather seal recess 494, 662. Alternatively, the pockets 250, 252, 300, 302, 354, 356, 404, 406, the first feather seal recess 254, 492, 660 and the second feather seal recess 256, 494, 662 may be formed via machining. The blades 222a-j are consolidated into a ring. The sectors 224a-j, 224a'-j', 224a"-j", 224a'''-j''' are coupled together to form a first blade ring (generally indicated as 600 in FIG. 2). In one example, a fixture is used to consolidate the blades 222a-j into the first blade ring, and the blades 222a-j are metallurgically bonded together, via transient liquid phase (TLP) braze bonding, for example, to form a gas tight blade ring. The blades 462a-j are consolidated into a ring. The sectors 464a-j, 464a'-j' are coupled together to form a second blade ring (generally indicated as 602 in FIG. 2). In one example, a fixture is used to consolidate the blades 462a-j into the second blade ring, and the blades 462a-j are metallurgically bonded together, via welding, for example, to form a gas tight blade ring. It should be noted that any desired technique can be employed to form the first blade ring and second blade ring.

The first blade ring and the second blade ring are machined as necessary to prepare for coupling with the first disk 220 and the second disk 460. The first disk 220 and the second disk 460 are formed. In one example, the first disk 220 and the second disk 460 are each formed by unitary forging, casting, hot isostatic pressing (HIP), metal injection molding, additive manufacturing and so on. The first blade ring comprising the blades 222a-j is coupled to the first disk 220 to form the forward turbine rotor 210. In one example, the first blade ring, including the blades 222a-j and the sectors 224a-j, 224a'-j', 224a"-j", 224a'''-j''', is metallurgically bonded to the first disk 220 along the inner peripheral surface 240 via diffusion bonding, for example. The second blade ring comprising the blades 462a-j and the sectors 464a-j, 464a'-j' is coupled to the second disk 460 to form the aft turbine rotor 212, 212'. In one example, the second blade ring, including each of the blades 462a-j and the sectors 464a-j, 464a'-j', is metallurgically bonded to the second disk 460 along the inner peripheral surface 476 via diffusion bonding.

Once assembled, the stress relief holes 206a-j and the stress relief slots 456a-j are machined or cut through the forward turbine rotor 210. The feather seals 280 are positioned within the first feather seal recesses 254, 304, 358, 408 and the second feather seal recesses 256, 306, 360, 410. The stress relief holes 510a-j, 672a-j and the stress relief slots 512a-j are machined or cut through the aft turbine rotor 212, 212', respectively. The feather seals 500 are positioned within the first feather seal recesses 492, 660 and the second feather seal recesses 494, 662. With reference to FIG. 1, the forward turbine rotor 210 is assembled to the aft turbine rotor 212, 212' to produce the axially split radial turbine rotor 200, and the axially split radial turbine rotor 200 is installed within the gas turbine engine 100. In one example, the axially-split radial turbine rotor 200 is assembled such that the blades 222a-j align axially with the blades 462a-j. The circumferential alignment of the blades 222a-j of the forward turbine rotor 210 and the blades 462a-j of the aft turbine rotor 212, 212' may also be maintained by friction augmented by an axial clamping force or pre-load exerted on the radial turbine rotor 200 by the tie-shaft 106. As a result, neighboring pairs of blades 222a-j and blades 462a-j cooperate to form contiguous blade structures which provide continuous or uninterrupted transitions between blade segment surfaces (i.e., from the inducer to the exducer). When assembled, radial turbine rotor 200 provides substantially uninterrupted airflow guide surfaces along the blade passage when transitioning from the first disk 220 to the second disk 460, and the feather seals 280, 500 coupled to the respective first feather seal recess 254, 492, 660 and second feather seal recess 256, 494, 662 minimize leakage of the high temperature working fluid between the flowpath and the volume enclosed by the pockets 250, 252, 300, 302, 354, 356, 404, 406, the respective first feather seal recess 254, 492, 660, the second feather seal recess 256, 494, 662, and the stress relief holes 206a-j, 510a-j, 672a-j. The pockets 250, 252, 300, 302, 354, 356, 404, 406 reduce a mass of the radial turbine rotor 200, and also thermally isolate the first disk 220 from the high temperature fluid or working fluid that flows along the outer peripheral surface 226 thereby reducing thermal induced fatigue while enabling greater rotational speeds. In one example, the pockets 250, 252, 300, 302, 354, 356, 404, 406 assist in maintaining the first disk 220 about 700 degrees Fahrenheit cooler than the outer peripheral surface 226. The thermal isolation of the first disk 220 by the pockets 250, 252, 300, 302, 354, 356, 404, 406 increases a life of the first disk 220, and thus, the radial turbine rotor 200.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A radial turbine rotor associated with an engine, comprising:
   a disk;
   a plurality of blades spaced apart about a perimeter of the disk, each blade of the plurality of blades including a forward end, an aft end and a root;
   a plurality of sectors, with each sector of the plurality of sectors coupled to the root of a respective blade of the plurality of blades, each sector of the plurality of sectors defines a first surface configured to contact a working fluid and a second surface configured to be coupled to the disk, each sector of the plurality of sectors defining at least one pocket between the first surface and the second surface proximate the forward end that extends toward the aft end, the at least one pocket having an enlarged forward recess portion defined proximate the forward end that tapers to an aft recess portion, and the aft recess portion extends from the forward recess portion to the aft end; and
   a feather seal slot defined between adjacent sectors of the plurality of sectors proximate the first surface.

2. The radial turbine rotor of claim 1, wherein each blade of the plurality of blades includes a pressure side opposite a suction side, and the at least one pocket includes a first pocket defined in each sector of the plurality of sectors proximate the pressure side, a second pocket defined in each sector of the plurality of sectors proximate the suction side, and a first volume of the first pocket is different than a second volume of the second pocket.

3. The radial turbine rotor of claim 1, wherein a recess of the feather seal slot is defined radially outboard of the at least one pocket.

4. The radial turbine rotor of claim 1, wherein a recess of the feather seal slot is in communication with the at least one pocket.

5. The radial turbine rotor of claim 4, wherein the at least one pocket is defined between the first surface and the second surface to extend from proximate the forward end to the aft end such that the aft recess portion of the at least one pocket is coextensive with a second end of the recess of the feather seal slot.

6. The radial turbine rotor of claim 1, wherein the radial turbine rotor is an axially split radial turbine rotor with a first radial turbine rotor coupled to a second radial turbine rotor, and the first radial turbine rotor includes the disk, the plurality of blades and the plurality of sectors.

7. The radial turbine rotor of claim 6, wherein the second radial turbine rotor includes a second disk, a plurality of second blades spaced apart about a perimeter of the second disk and a plurality of second sectors, with each second sector of the plurality of second sectors coupled to a respective second blade of the plurality of second blades, and a second feather seal slot is defined between adjacent second sectors of the plurality of second sectors.

8. The radial turbine rotor of claim 7, further comprising a plurality of stress relief slots defined between the adjacent sectors of the plurality of sectors of the first radial turbine rotor.

9. The radial turbine rotor of claim 8, wherein the second radial turbine rotor includes a second plurality of stress relief slots defined through the adjacent second sectors of the plurality of second sectors.

10. The radial turbine rotor of claim 9, wherein the second radial turbine rotor includes a second plurality of second stress relief holes, each second stress relief hole of the second plurality of stress relief holes defined through at least a portion of the disk, and each of the second plurality of stress relief slots is in communication with a respective second stress relief hole of the second plurality of second stress relief holes.

11. The radial turbine rotor of claim 10, wherein the first radial turbine rotor further comprises a plurality of stress relief holes, each stress relief hole of the plurality of stress relief holes defined through at least a portion of the disk, and each of the plurality of stress relief slots is in communication with a respective stress relief hole of the plurality of stress relief holes.

12. The radial turbine rotor of claim 11, wherein each stress relief hole of the plurality of stress relief holes is offset from each second stress relief hole of the second plurality of second stress relief holes.

13. The radial turbine rotor of claim 11, wherein each stress relief hole of the plurality of stress relief holes is coincident with each second stress relief hole of the second plurality of stress relief holes.

14. The radial turbine rotor of claim 7, wherein each sector of the plurality of sectors includes a first feather seal recess defined proximate the suction side and a second feather seal recess defined proximate the pressure side, with the first feather seal recess and the second feather seal recess cooperating to define the feather seal slot between the adjacent sectors of the plurality of sectors.

15. The radial turbine rotor of claim 14, wherein the second feather seal slot is misaligned with the feather seal slot.

16. The radial turbine rotor of claim 1, wherein the at least one pocket is a void defined in each sector of the plurality of sectors.

17. A radial turbine rotor associated with an engine, comprising:
- a disk;
- a plurality of blades spaced apart about a perimeter of the disk, each blade of the plurality of blades including a forward end, an aft end and a root;
- a plurality of sectors, with each sector of the plurality of sectors coupled to the root of a respective blade of the plurality of blades, each sector of the plurality of sectors defines a first surface configured to contact a working fluid and a second surface configured to be coupled to the disk, each sector of the plurality of sectors having a first side, a second side opposite the first side and defining a first pocket between the first surface and the second surface proximate the forward end that extends toward the aft end along the first side, a second pocket between the first surface and the second surface proximate a leading end that extends toward a trailing end along the second side, the second side opposite the first side; and
- a feather seal slot defined between adjacent ones of the plurality of sectors proximate the first surface,
- wherein the radial turbine rotor is an axially split radial turbine rotor with a first radial turbine rotor coupled to a second radial turbine rotor, the first radial turbine rotor includes the disk, the plurality of blades and the plurality of sectors, the second radial turbine rotor includes a second disk, a plurality of second blades spaced apart about a perimeter of the second disk and a plurality of second sectors, with each second sector of the plurality of second sectors coupled to a respective second blade of the plurality of second blades and a second feather seal slot is defined between adjacent second sectors of the plurality of second sectors.

18. The radial turbine rotor of claim 17, wherein a recess of the feather seal slot is defined radially outboard of the at least one pocket.

19. The radial turbine rotor of claim 17, wherein a recess of the feather seal slot is in communication with the first pocket.

20. A radial turbine rotor associated with an engine, comprising:
- a disk having a first side opposite a second side;
- a plurality of blades spaced apart about a perimeter of the disk, each blade of the plurality of blades including a forward end, an aft end and a root;
- a plurality of sectors, with each sector of the plurality of sectors coupled to the root of a respective blade of the plurality of blades, each sector of the plurality of sectors defines a first surface configured to contact a working fluid and a second surface configured to be coupled to the disk, each sector of the plurality of sectors defining at least one pocket between the first surface and the second surface proximate the forward end that extends toward the aft end;
- a plurality of stress relief holes, with each stress relief hole of the plurality of stress relief holes defined through the disk to extend from the first side to the second side and associated with a respective one of the plurality of sectors, and the at least one pocket is defined between the first surface and a respective one of the plurality of stress relief holes; and
- a feather seal slot defined between adjacent sectors of the plurality of sectors proximate the first surface.

\* \* \* \* \*